US012784746B1

(12) United States Patent
Segal et al.

(10) Patent No.: US 12,784,746 B1
(45) Date of Patent: Nov. 3, 2026

(54) EMOTIONAL INTELLIGENCE IN LANGUAGE MODEL-BASED CONVERSATIONAL AGENTS THROUGH SITUATIONALLY ADAPTIVE TRAIT EXPRESSION

(71) Applicant: Amazon Technologies, Inc., Seattle, WA (US)

(72) Inventors: Mara Clair Segal, Menlo Park, CA (US); Chun Hui Bao, Seattle, WA (US); Ruonan Hao, Kirkland, WA (US); Bryan Jimenez, Seattle, WA (US); Maitri Prraveg Shroff, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 199 days.

(21) Appl. No.: 18/901,508

(22) Filed: Sep. 30, 2024

(51) Int. Cl.
*G10L 15/183* (2013.01)
*G10L 13/02* (2013.01)
(Continued)

(52) U.S. Cl.
CPC ............ *G10L 15/183* (2013.01); *G10L 13/02* (2013.01); *G10L 15/1815* (2013.01); *G10L 15/22* (2013.01)

(58) Field of Classification Search
CPC ... G10L 15/183; G10L 13/02; G10L 15/1815; G10L 15/22
(Continued)

(56) References Cited

U.S. PATENT DOCUMENTS 11,138,858 B1 * 10/2021 Segal ................. G08B 21/0469
11,257,346 B1 * 2/2022 Meyers ................... G06F 3/011
(Continued)

FOREIGN PATENT DOCUMENTS

WO WO-2025099939 A1 * 5/2025 ............. G06N 20/00
WO WO-2025228029 A1 * 11/2025 ........... G10L 15/005

OTHER PUBLICATIONS

Gu, Heng, Chadha Degachi, Uğur Genç, Senthil Chandrasegaran, and Himanshu Verma. “On the effectiveness of creating conversational agent personalities through prompting.” arXiv preprint arXiv:2310.11182 (2023).*
(Continued)

*Primary Examiner* — Edwin S Leland, III
(74) *Attorney, Agent, or Firm* — Nicholson DeVos Webster Elliott LLP

(57) ABSTRACT

Techniques for simulating emotional intelligence in language model-based conversational agents through situationally adaptive trait expression are described. A text representation of a recording of a verbal request of a user recorded by a device and a paralinguistic caption indicative of a paralinguistic sentiment of the recording are sent to a user sentiment classifier model, which generates an estimated actual sentiment of the user. A first set of instructions are selected based at least in part on the estimated actual sentiment of the user, and include at least one trait to emphasize in a response to the verbal request. A first prompt to generate the response to the verbal request is sent to a language model, the first prompt including the first set of instructions. The response to the verbal request is received from the language model, and the response is sent to a rendering component for output by the device.

20 Claims, 14 Drawing Sheets

(51) Int. Cl.
*G10L 15/18* (2013.01)
*G10L 15/22* (2006.01)

(58) Field of Classification Search
USPC .......................................................... 704/235
See application file for complete search history.

(56) References Cited

U.S. PATENT DOCUMENTS

| | | | | |
|---|---|---|---|---|
| 12,248,463 | B1 * | 3/2025 | Palla | G06F 16/243 |
| 12,315,491 | B1 * | 5/2025 | Raji | A63F 13/54 |
| 2024/0411988 | A1 * | 12/2024 | Ritchie | G06F 40/226 |
| 2025/0069086 | A1 * | 2/2025 | Sotiriou | G06F 40/40 |

OTHER PUBLICATIONS

Lin, Guan-Ting, Prashanth Gurunath Shivakumar, Ankur Gandhe, Chao-Han Huck Yang, Yile Gu, Shalini Ghosh, Andreas Stolcke, Hung-yi Lee, and Ivan Bulyko. “Paralinguistics-enhanced large language modeling of spoken dialogue.” In ICASSP 2024-2024 IEEE International Conference on Acoustics, Speech and Signal Processing.*

Jiang, Guangyuan, Manjie Xu, Song-Chun Zhu, Wenjuan Han, Chi Zhang, and Yixin Zhu. “Evaluating and inducing personality in pre-trained language models.” Advances in Neural Information Processing Systems 36 (2023): 10622-10643.*

* cited by examiner

EMOTIONAL INTELLIGENCE IN LANGUAGE MODEL-BASED CONVERSATIONAL AGENTS THROUGH SITUATIONALLY ADAPTIVE TRAIT EXPRESSION

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Such processing may be used by computers, hand-held devices, telephone computer systems, kiosks, and a wide variety of other devices to improve human-computer interactions.

BRIEF DESCRIPTION OF DRAWINGS

Various examples in accordance with the present disclosure will be described with reference to the drawings, in which.

DETAILED DESCRIPTION

Figure 1:
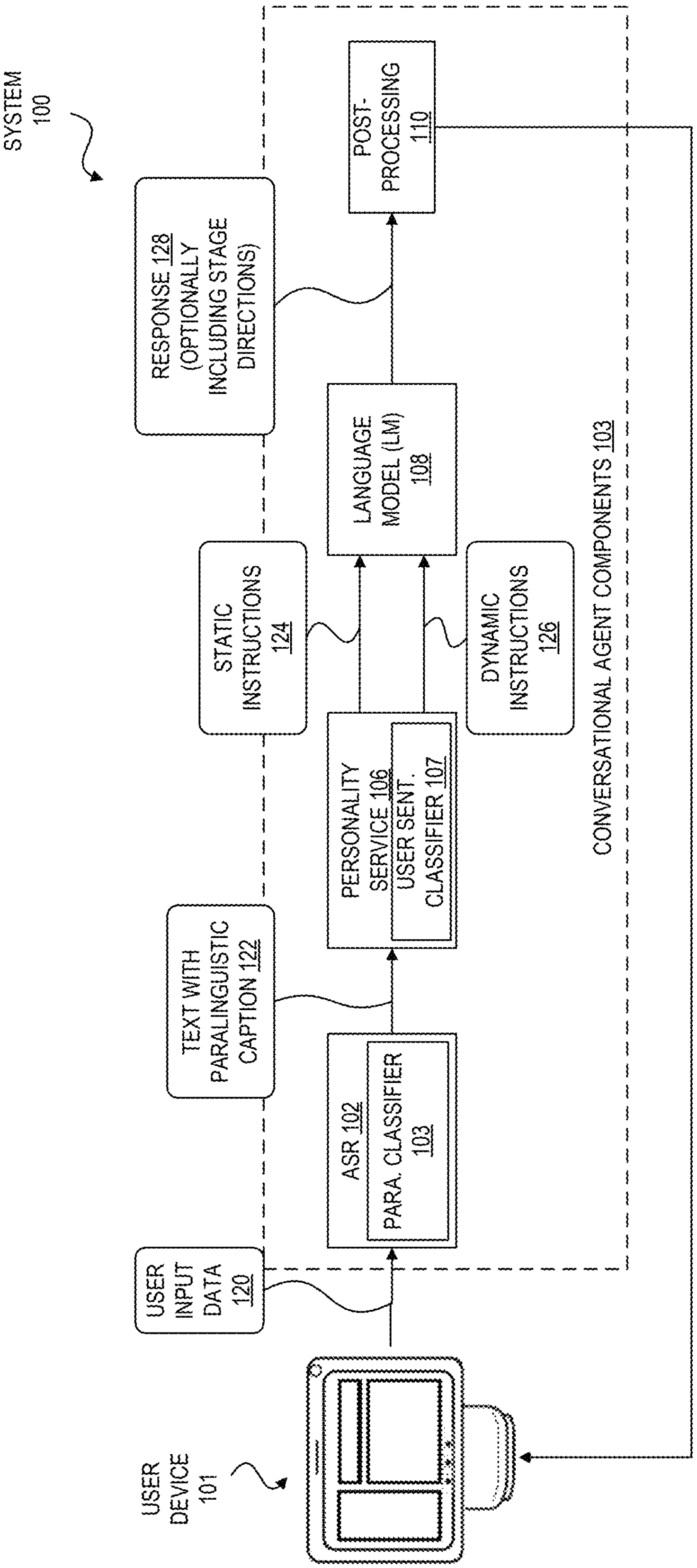
FIG. 1 is a diagram illustrating high level components and architecture of a language model-based conversational agent system with emotional intelligence through situationally adaptive trait expression, according to some examples of the present disclosure.

The present disclosure relates to methods, apparatus, systems, and non-transitory computer-readable storage media for situationally adaptive trait expression in language model-based conversational agents. The phrase situationally-adaptive trait expression (SATE) refers to the ability of a conversational agent (CA), also referred to as a dialog system or digital assistant, to surface different traits in formulating responses based on situational context. Like humans, SATE enables a CA to surface different traits depending on the context of an interaction. With SATE, a CA may be more fun around children or in an explorative or excited environment, and less fun when talking about the news, for example. With SATE, CAs are able to showcase specific traits at the right moments to be appropriate and resonant. By surfacing relevant traits during a conversation at appropriate times, CAs using techniques described herein can exhibit improved emotional intelligence—sometimes referred to as EQ—to users.

Rudimentary attempts at implementing EQ in CA systems risk falling flat: the CA can respond in a manner inappropriate given the context of a user's request. Appearing tone-deaf can lead to a poor user experience. In order to improve perceived CA EQ, examples of CA systems described herein provide SATE instructions to a language model (e.g., a large language model (LLM)). At a high level, SATE instructions identify situationally appropriate trait(s) to adopt or otherwise emphasize in formulating a response.

End-to-end latency is an important aspect of a user's experience with a CA. Even seconds long delays can interrupt natural conversation flow. Introducing additional components to identify the appropriate trait expression instructions to inject into the LM can negatively impact this end-to-end latency. To mitigate these delays while still enabling SATE, in some examples SATE instructions are split across multiple interactions with an LM. Initial, static instructions can be provided to the LM at some point earlier in interactions with the LM than dynamic instructions contingent on an estimate of the user's actual sentiment. In this manner, the processing time to estimate the user's actual sentiment can occur "offline" from the LM in that the LM is able to perform other operations.'

In some examples, SATE instructions including the estimate of the user's actual sentiment are injected at the final step of language model (LM) inference where the LM is prompted to generate the response to a user request. LMs generally include a prompt-response interface, subject to their specific input and output modalities (e.g., text, images, video, audio). Multiple prompts can be submitted prior to submitting a prompt asking for a response to the user's request. Sequential prompts to and responses from the LM can form a conversational history that the LM can use in formulating intermediate responses as well as the final response to a user request. The final prompt that requests the LM generate a response to a user's request can include the estimate of the user's actual sentiment. Doing so improves the consistency at which appropriate traits are expressed across multiple domain interactions (e.g., providing news, the weather, playing a song, adjusting lighting, telling a joke, etc.).

In some examples, the system supports "characters" such as real or fictional personas having distinct personality traits. In these cases, the trait expression instructions can include these character traits to bias the situationally appropriate traits. For example, if a character has a strong "sarcasm" trait while the situationally appropriate trait is "empathy," the LM can be instructed to respond with a combination of empathy and sarcasm. In some cases, the character traits may override the situationally appropriate traits such as by omitting the empathy trait from the instruction in the above example.

As used herein, a "generative model" refers to a machine learning model that generates new data instances. A generative model includes a data distribution itself. A discriminative model, in contrast, discriminates between different kinds of data instances. For example, a generative model may generate a photo of animals that look like real animals, whereas a discriminative model can identify whether an image is of a dog or a cat (or other discrete animal categories). Example generative models include (large) language models.

Language models analyze bodies of text data to provide a basis for their word predictions. The language models are generative models. In some examples, one or more of the language models of the system described herein may be a large language model (LLM). A language model is an advanced artificial intelligence system designed to process, understand, and generate human-like text based on relatively large amounts of data. In some examples, a language model (or another type of generative model) may be further designed to process, understand, and/or generate multi-modal data including audio, text, image, and/or video. A language model may be built using deep learning techniques, such as neural networks, and may be trained on extensive datasets that include text (or other type of data, such as multi-modal data including text, audio, image, video, etc.) from a broad range of sources, such as old/permitted books and websites, for natural language processing. An LLM uses a larger training dataset, as compared to a relatively smaller language model, and can include a relatively large number of parameters (in the range of billions, trillions or more), hence, they are called "large" language models. In some examples one or more of the language models (and their corresponding operations, discussed herein below) may be the same language model.

In some examples, the one or more language models may be transformer-based sequence-to-sequence (seq2seq) models involving an encoder-decoder architecture. In an encoder-decoder architecture, the encoder may produce a representation of an input (e.g., audio, text, image, video, etc.) using a bidirectional encoding, and the decoder may use that representation to perform some task. In some such examples, one or more of the language models may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the language model may be pre-trained for approximately 1 trillion tokens. Being trained on CLM tasks, the one or more language models may be capable of in-context learning. Examples of such a language model include some of Amazon Alexa and Amazon Web Services (AWS) Titan family of generative models.

In other examples, the one or more language models may be a decoder-only architecture. The decoder-only architecture may use left-to-right (unidirectional) encoding of the input (e.g., audio, text, image, video, etc.). Examples of such a language model include others in the Amazon Alexa and AWS Titan family of models as well as the Generative Pre-trained Transformer 3 (GPT-3), GPT-4, and other versions of GPT. GPT-3 reportedly has a capacity of (approximately) 175 billion machine learning parameters. GPT-4 reportedly has a capacity of (approximately) 1.76 trillion machine learning parameters.

Other examples of language models (e.g., LLMs) include BigScience Large Open-science Open-access Multilingual Language Model (BLOOM), Language Model for Dialogue Applications model (LaMDA), Bard, Large Language Model Meta AI (LLaMA), etc.

In some examples, the system may include one or more other machine learning models (e.g., discriminative models) instead of or in addition to the generative models. Such machine learning model(s) may receive text and/or other types of data as inputs (e.g., audio, image, video, etc.), and may output text and/or the other types of data. Such model(s) may be neural network-based models, deep learning models, classifier models, autoregressive models, seq2seq models, etc.

An artificial intelligence (AI) system may use ASR, NLU, NLG, and/or TTS, each with and/or without a language model or other type of generative model, for processing user inputs, including natural language inputs (e.g., typed and spoken inputs) and other type of inputs (e.g., inputs not received from a user, inputs received from a system component, inputs representing occurrence of events, etc.). The AI system may use other types of generative models including a speech-to-speech model (that may process audio data and generate audio embedding data/audio tokens that can be used to generate synthesized speech), text-to-speech model (that may process text data or other textual representations and generate audio embedding/token data), speech-to-text model (that may process audio data and generate text data or other textual representations), image-to-text model (that may process image (or video) data and generate text data or other textual representations), text-to-image data (that may process text or other textual representations and generate image (or video) data), a multi-modal generative model (that may process one or more types of input data (e.g., text, audio and/or image) and generate one or more types of output data (e.g., text, audio, and/or image)), and other types.

A generative model may receive an input in the form of a prompt. A prompt may be a natural language input, for example, a directive or request, for the generative model to generate an output according to the prompt. The output generated by the generative model may be a natural language output responsive to the prompt. In some examples, the output may additionally or instead be another type of data, such as audio, image, video, etc. The prompt and the output may be text in a particular language (e.g., English, Spanish, German, etc.). For example, for the prompt "how do I cook rice?", the language model may output a recipe (e.g., a step-by-step process represented by text, audio, image, video, etc.) to cook rice. As another example, for the prompt "I am hungry. What restaurants in the area are open?", the language model may output a list of restaurants near the user that are open at the time of the user prompt.

A generative model may be configured (e.g., trained) using various learning techniques. For example, in some examples, a generative model may be configured using a few-shot learning. In few-shot learning, the model learns how to learn to solve the given problem. In this approach, where the model is provided with (e.g., in the prompt) a limited number of exemplars (i.e., "few shots") from the new task, and the model uses this information to adapt and perform well on that task. Few-shot learning may require less training data than implementing other fine-tuning techniques. For further example, a generative model may be configured using one-shot learning, which is similar to few-shot learning except the model is provided with a single exemplar (e.g., in the prompt). As another example, a generative model may be configured using zero-shot learning. In zero-shot learning, the model solves the given problem without exemplars of how to solve the problem and just based on the model's training dataset. In this approach, the model is provided with data not observed during training, and the model learns to generate an appropriate output based on its learning of other data.

A system according to the present disclosure will ordinarily be configured to incorporate user permissions and only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 is a diagram illustrating high level components and architecture of a language model-based conversational agent (CA) system with emotional intelligence through situationally adaptive trait expression, according to some examples of the present disclosure. As shown, a CA system 100 includes a user device 101 and various CA components 103. The CA components 103 include an automated speech recognition (ASR) component 102, a personality service 106, a language model (LM) 108, and post-processing components 110. In some examples, one or more of the CA components are implemented as software applications executed on computing resources provided by in a cloud environment. Of course, in other examples, one or more of the CA components 103 may be implemented on the user device 102 or with processing facilities between the cloud resources, if present, and the user device 102.

At a high level, the user device 101 captures a user's request (also referred to herein as an utterance) and provides user input data 120 (e.g., an audio recording) to the CA, and the CA leverages the language model 108 to generate a response to the user's request.

An automatic speech recognition (ASR) component 102 receives and processes the audio data 120. As the name suggests, the ASR component 102 transcribes the audio signal into text. The ASR component 102 can query a paralinguistic classifier 104 that provides a paralinguistic caption characterizing the recording. The paralinguistic classifier 104 is neural network model trained to assign a sentiment classification to the audio recording based on paralinguistic characteristics of the signal (e.g., cadence, intonation, etc.). The classifier 104 can be considered a discriminative model. Depending on the implementation of the paralinguistic classifier 104, the resulting "paralinguistic sentiment classification" or just "paralinguistic caption" can have varying degrees of specificity, depending on the model. For example, a general paralinguistic caption can indicate the tone of the user was positive, neutral, or negative. A more specific caption can indicate the tone of the user to a greater degree of specificity such as frustrated, sad, happy, excited, etc. Additional details on ASR are provided below with reference to the ASR component 102 in FIG. 11.

The personality service 106 processes the transcribed text and paralinguistic caption to select SATE instructions to include in prompts to the LM. It is noted that the paralinguistic caption may not be reflective of the user's true sentiment. Similarly, the lexical sentiment (e.g., obtained through an analysis of the recognized text) may also fail to properly reflect the user's sentiment. The following are exemplary scenarios where the lexical sentiment does not reflect the user's real sentiment.

- "I'm so excited! Darn!" with a neutral tone could really mean sarcastic
- "What a beautiful day" in a cheerful tone during a snowstorm could really mean irony
- "Sure, whatever you want" in a neutral tone could really mean frustration or disagreement
- "That's interesting" with a neutral tone could really mean not so interesting
- "I understand your perspective" with a neutral tone could really mean disagreement
- "Oh no, not again!" with a positive tone could really mean playful, excited.
- "I'm excited about working over the weekend" with a neutral tone could really mean regulated negative emotion
- "I'm not upset", "I'm fine" with a neutral or negative tone could really mean suppressed emotion, frustrated, annoyed
- "Thank you, it's lovely.", "That sounds great!", "Good, thanks"-in the United States, could mean neutral as a social norm To reconcile these seemingly contradictory lexical and paralinguistic sentiments, the personality service 106 includes a user sentiment classifier 107 to estimate the user's actual sentiment. The user sentiment classifier 107 is a trained neural network model that takes as inputs the paralinguistic caption and text 122 and outputs a prediction of the user's actual sentiment. The user sentiment classifier 107 can be considered a discriminative model. Because the runtime of the user sentiment classifier model 107 may be non-trivial, the personality service 106 can, prior to responding with the estimation of the user's actual sentiment, provide initial, static SATE instructions 124 to be included in a prompt to the LM 108'. Later, once the user sentiment classifier 107 has generated an estimated actual sentiment of the user, the personality service 106 can provide one or more dynamic SATE instructions 126.

In this manner, the user sentiment classifier 107 can execute in parallel to other LM 108 operations that identify and plan how to accomplish the user's request. The static SATE instructions 124 can precondition the LM 108 (e.g., through key-value caching) that become part of the conversation history with the LM 108 such that LM 108 processing time associated with the dynamic SATE instructions 126, when available, is reduced as compared to processing both the static and dynamic instructions in a single prompt. Doing so moves at least a portion of the LM response-compute time to occur while the user's actual sentiment is being estimated. The personality service 106 can be considered a form of co-processor to the LM 108.

In some examples, the personality service 106 includes a knowledge base (not shown) that includes the static and dynamic instructions that can be selected for inclusion in prompts to the LM 108. Static instructions generally include those instructions that are not contingent on the estimation of the user's actual sentiment from the user sentiment classifier 107. Meanwhile, dynamic instructions are those that are contingent on the estimation of the user's actual sentiment.

Exemplary categories of instructions include agent traits, response rules, and stage directions (e.g., how to annotate a response to cue audio, visual, or other indicators in the rendering of the CA's response to the user's request). These categories may be further broken down into include global (e.g., applicable to all response scenarios) and locale-specific (e.g., applicable to all scenarios in the user's location or home country). The personality service 106 can select static instructions based on one or more characteristics associated with the user's request that are available prior to estimating the user's actual sentiment. Such request characteristics can include the location of the user device 101, the user's preference, etc.

In some examples, static SATE instructions 124 can include instructions regarding global traits of the CA. An exemplary global traits instruction follows.

---

Global Traits
You [the agent] should demonstrate emotional intelligence by appropriately adapting your response to the situation and connect with users with a [verbose description of positive characteristics]. You should adapt your own emotional sentiment to the 'sentiment of the user in order to convey [description of empathetic output]". Consider the potential impact of your response to and [additional guidance]. You [the agent] have the following character traits:
[train 1] - [description of trait 1]
[trait 2]: [description of trait 2].
[trait 3]: [description of trait 3].

---

In some examples, static SATE instructions 124 can include instructions regarding global rules. An exemplary global rule instruction follows.

---

IMPORTANT: When the user feels [negative emotion], you recognize the negative emotion, the severity of the emotion, and respond with [trait], adapting accordingly to the user's 'emotion and providing either follow up questions to learn more or giving actionable advice.

---

In some examples, the static SATE instructions 124 can instruct the LM 108 to generate its output with stage directions. Stage directions can be embedded within a response and provide downstream post-processing components 110 with instructions or parameters on how to render a responsive output. One such post-processing component 110 is a text-to-speech component (e.g., synthetic speech generation component 1056) that renders audio corresponding to the response text according to the particular stage direction. Another such post-processing component 108 is an APIs to call a display library of the user device 101 to render particular aspect(s) of the display a certain color based on the stage direction(s). An exemplary global stage direction instruction follows.

---

Global Stage Directions
You must start your response with "Response:" to talk. When you are generating a response prefixed with "Response:", it must align with an appropriate tone to support or engage the user thoughtfully, considering their emotional state. You have a list of tones that you can select, contained in <ResponseTones></ResponseTones> XML tag.

-continued

---

<ResponseTones>
[tone 1]: [description of tone 1]
[tone 2]: [description of tone 2]
. . .
</ResponseTones>

---

Continuing, the global stage directions can also include instructions on how to tag responses with those directives for downstream rendering components to act. Such directives may include tones, graphics, etc. that can be used to instruct downstream rendering. For example, a downstream text-to-speech component can generate an appropriately toned response based on the indicated tone tag, a downstream display component can render an animation (e.g., fireworks for a celebration) based on the indicated tone tag, etc.

---

Carefully read the tone definition and strictly follow the output format in the examples, such as using brackets [ ] to enclose the tone tags. You should only choose tones from the given list above, and you MUST select at least one tone. You can have at most one tone tag per sentence. Even if a single tone is selected, tag the response with the tone tag at the beginning to maintain clarity. If multiple tones are used, ensure each part of the response is tagged accordingly. Here is the list of examples you can refer to, contained in <ResponseGenerationExamples> </ResponseGenerationExamples> XML tag.
<ResponseGenerationExamples>
<Example>
User: How do I make a sandwich?
Response: [cheerful] Great question! Here's how to make a sandwich: [confident] 1. Gather ingredients. You'll need bread, something to spread on the bread (like butter or mayonnaise), and something to put in the middle of the sandwich (like meat, cheese, or vegetables). 2. Place the bottom piece of bread on a plate. 3. Spread the bread with something to spread. 4. Put the filling in the middle of the bread. 5. Top with the other piece of bread. 6. Eat!
</Example>
. . .
</ResponseGenerationExamples>

---

In the example instruction above, for example, the LM 106 is permitted to insert a tone tag for each sentence in the response (e.g., "[cheerful] Great question!"). Such a tone tag can cause, for example, a downstream display rendering component to render aspects of the display yellow, or a downstream TTS component to generate audio with a stepped up tone to indicate cheerfulness.

In some examples, static SATE instructions 124 can include instructions regarding locale-specific CA traits and/or rules. For example, in many East Asian cultures, it can be considered polite and humble to decline compliments or praise at first, even if one appreciates the sentiment. Directly accepting a compliment can be seen as boastful. So, if a CA user in Japan compliments the CA's helpfulness, a more culturally appropriate response in that locale would be something like: "Thank you, I'm glad I could be of assistance. However, I'm just doing my job to the best of my abilities." This type of modest, deferential response would be more fitting than a direct "Thank you, I'm happy I could help!" which could come across as immodest in that cultural context. In contrast, a user in the United States might find the more humble response to be unnecessarily self-deprecating. A more natural response there could be a straightforward "Thank you, I'm glad I could help!"

In some examples, static SATE instructions 124 can include an instruction regarding the user's current sentiment as indicated through the paralinguistic caption prior to reconciliation with the lexical sentiment by the user sentiment classifier 107.

---

Dynamic Situational Guidance
IMPORTANT: Current paralinguistic sentiment for the user is frustrated.

---

It is noted here that the above described static instructions 114 are exemplary. More generally, static SATE instructions can be considered those instructions that (1) influence how the LM 108, and thus the CA, generates the response to a user request and (2) are independent of the output of the user sentiment classifier 107 of the personality service 106. As a result, they can be sent without waiting for the user sentiment classifier 107 to provide the prediction of the user's sentiment. Doing so allows the LM 108 to ingest the static instructions while the personality service 106 waits for the estimated sentiment from the user sentiment classifier 107. Note the output of the user sentiment classifier 107 may variously be referred to herein as the estimated actual sentiment, predicted actual sentiment, or just "actual sentiment."

Once the user's actual sentiment is computed, the personality service 106 can provide the LM 108 with one or more dynamic SATE instructions 126. Dynamic SATE instructions provide situational guidance dependent on the user's estimated actual sentiment. In some examples, the dynamic SATE instructions 126 are standalone instructions. In other examples, the dynamic SATE instructions 126 can update or override previously provided guidance in the static SATE instructions 124. An updated instruction with the estimated actual user sentiment follows (with the update underlined):

---

Dynamic Situational Guidance
IMPORTANT: Current paralinguistic sentiment for the user is frustrated, the user's realsentiment is [description of sentiment], respond emphasizing [one or more traits].

---

In some examples, the dynamic SATE instructions 126 can be embedded in the prompt that requests the LM 108 generate a response to the user's request. This can ensure the realization of CA traits is consistent across different user requests regardless of the particular request function invoked (described in more detail with reference to FIGS. 3 to 6).

After one or more processing iterations with the language model 108, the language model 108 will generate a final, user-facing response 128, which can optionally include various stage directions. This response 128 is sent to the post-processing components 110 for rendering by the user device 101.

Figure 2:
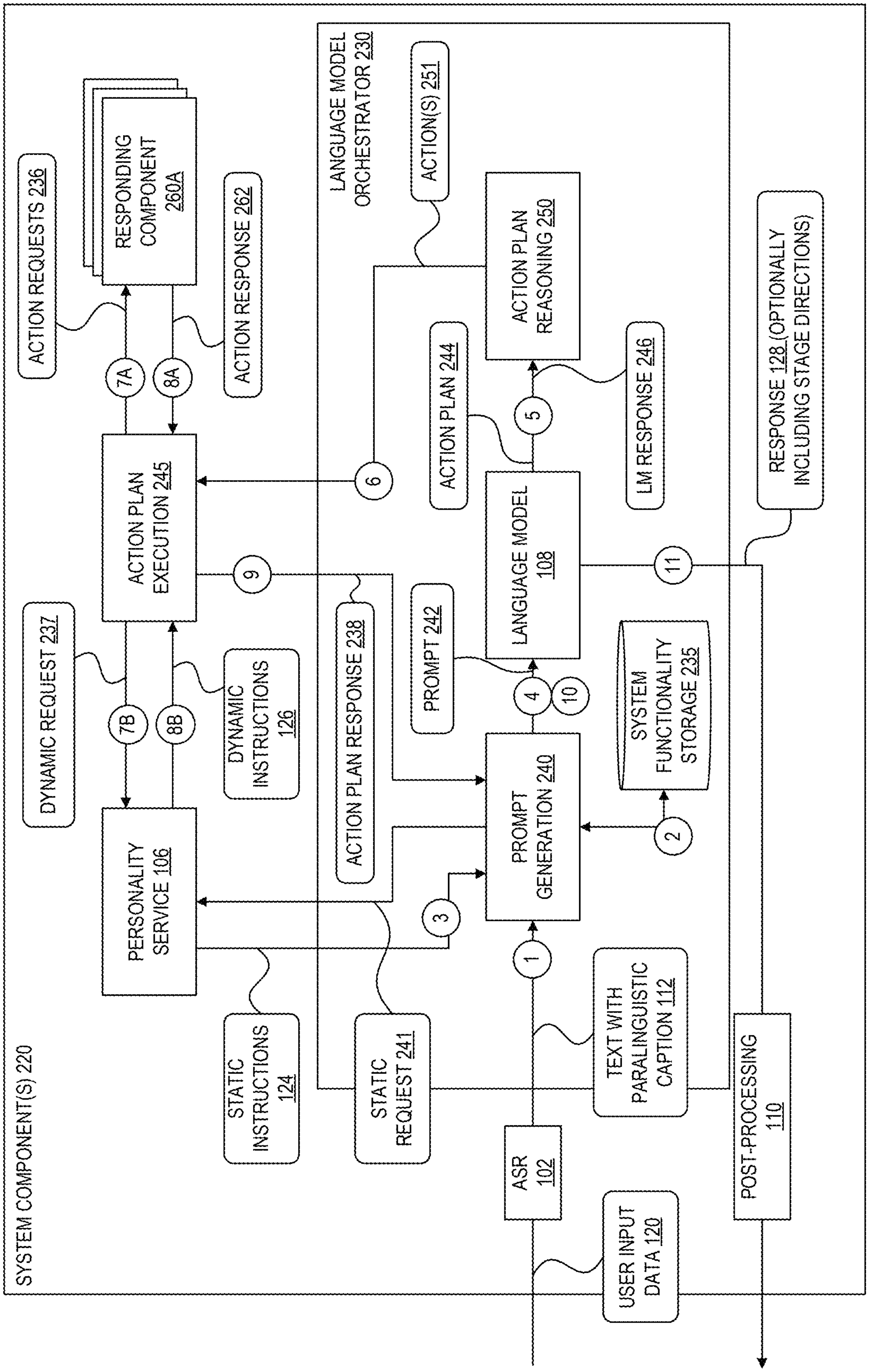
FIG. 2 is a diagram illustrating example processing of a system configured to use a language model to respond to a user input, according to examples of the present disclosure.

FIG. 2 illustrates example processing of user input data 120 (e.g., audio data) by a system component(s) 220 using a language model 108 (an example of a generative model). The system component(s) 220 may include, among other things, a language model orchestrator component 230, an action plan execution component 225, and one or more responding components 260. The language model orchestrator component 230 may include, among other things, a prompt generation component 240, the language model 108, an action plan reasoning component 250, and a system functionality storage 235. Although the figures and discussion of the present disclosure illustrate certain components and steps in a particular order, the components may be implemented in a different manner (as well as certain components removed or added) and the steps described may be performed in a different order (as well as certain steps removed or added) without departing from the present disclosure.

In some examples, the language model orchestrator component 230 instructs the language model 108 over multiple processing phases. The processing phases may be performed in a particular order. For example, during a first phase of processing, the language model 108 may perform task generation to generate a list of tasks to be performed in order to respond to a user input. During a second phase of processing, based on the list of tasks, the language model 108 may perform action generation to generate action requests (or directives) for a responding component(s) to perform an action(s) related to the tasks/user input. During a third phase of processing, based on information received from the responding component(s) 260, the language model 108 may generate a response to the user input and/or cause a component(s) of the system to perform further action(s).

In some examples, the language model 108 may perform iterative processing (e.g., multiple processing cycles, multiple processing phases, etc.) with respect to a given user input data 120. Such iterative processing is illustrated and described herein with respect to FIG. 2. For example, in a first iteration of processing the language model 108 may receive a first prompt from the prompt generation component 240, in response to which the language model 108 may determine an action plan including one or more tasks to be performed with respect to the user input data 120, then at least one of the determined task(s) may be performed, the results of the performed task(s) may be provided to the language model 108 via a second prompt, in response to which the language model 108 determine one or more actions to be performed, or the language model 108 may determine that a (final) response 128 to the user input is to be presented (step 11).

The system functionality storage 235 includes a hierarchical data structure representing system functionalities in a modularized manner. The hierarchical data structure is usable by the language model 108 to generate an action plan for responding to a user input. The hierarchical data structure enables the language model 108 to assess the capabilities of the system in a holistic manner and optionally gain granular knowledge of actions (e.g., APIs and other non-API functions). This dual perspective enables the language model 108 to orchestrate utilization of system functionalities as well as efficiently leverage APIs and non-API functions associated with those functionalities.

Figure 3:
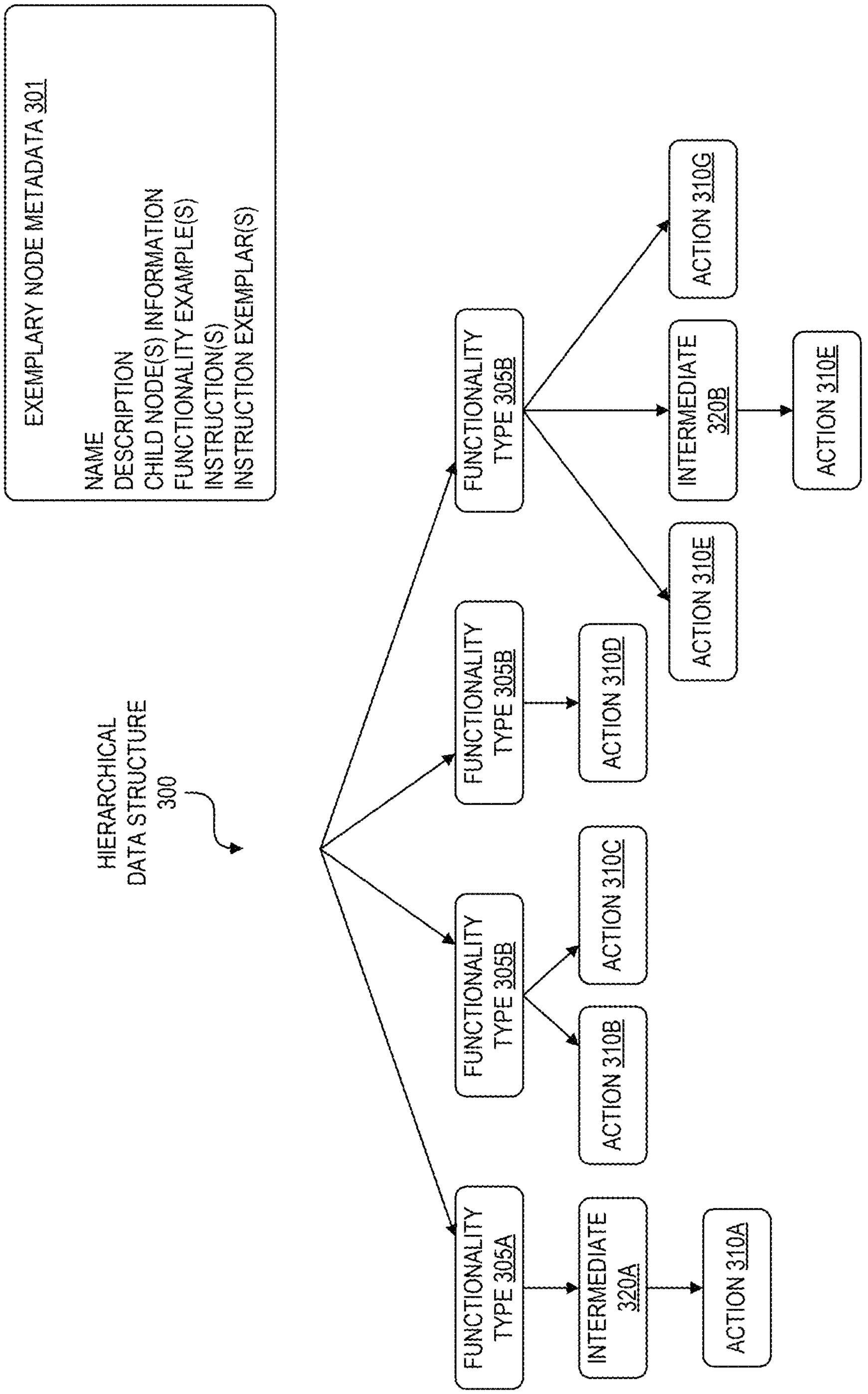
FIG. 3 is a diagram illustrating an example hierarchical data structure, according to examples of the present disclosure.

An example hierarchical data structure 300 is illustrated in FIG. 3. The uppermost layer of the hierarchical data structure 300 includes functionality type nodes 305 corresponding to functionality types supported by the system. The uppermost layer of functionality type nodes 305 provides the language model 108 with information that is independent of particular actions performable by system components. That is, the language model 108 may utilize the uppermost layer of functionality type nodes 305 to determine which one or more functionality type correspond to the user input and, separately thereafter, determine which action(s) of the determined functionality type(s) is to be included in the action plan. Example functionality types include factual question answering, smart home device control, media streaming, calendar management, and shopping assistance. In some examples, a functionality type may correspond to a domain of the system.

The number of functionality type nodes 305 may be limited to a manageable set that fits within the prompt space of the language model 108. In other words, the number of functionality type nodes 305 may correspond to an amount of information that, when tokenized, is less than a threshold amount of tokens. The threshold amount of tokens may be configurable as the prompt space for different generative models may be different. For example and not limitation, the hierarchical data structure 300 may include a first functionality type node 305*a* corresponding to a first functionality type of the system, a second functionality type node 305*b* corresponding to a second functionality type of the system, a third functionality type node 305*c* corresponding to a third functionality type of the system, and a fourth functionality type node 305*d* corresponding to a fourth functionality type of the system.

The functionality type nodes 305 are associated (either directly or via one or more intermediate nodes 320) with action nodes 310 (e.g., action nodes 310*a*, 310*b*, 310*c*, 310*d*, 310*e*, 310*f*, and 310*g*), each specific to one or more APIs of the system and/or non-API functions (e.g., specific prompts to the language model 108 to itself generate certain content). For example, an action node 310 may correspond to a single API or group of related APIs (e.g., APIs that can generate the same type of output data). As used herein, an "API" refers to software that allows one system component to cause another system component to perform certain processing using particular data.

An action node 310 may not have any child nodes. Nodes that do not have any child nodes may be referred to as "leaf nodes." As an example, for a workflow designed to respond to a user input requesting a joke, the hierarchical data structure 300 may include a conversation functionality type node, and one or more corresponding child nodes including an action node corresponding to an API(s) for writing jokes, an action node corresponding to an API(s) for loading jokes from a database, and/or an action node corresponding to a non-API function for prompting the language model 108 to generate a joke.

The number of layers in the hierarchical data structure 300 are configurable based on the desired granularity of the system functionality to be represented. For example, a functionality type node 305*a* may be associated with an intermediate node 320*a*, and the intermediate node 320*a* may be associated with an action node 310*a*. For further example, a functionality type node 305*d* may be associated with an action node 310*e*, an intermediate node 320*b*, and an action node 310*g*, and the intermediate node 320*b* may be associated with an action node 310*f*. As a specific example, a media streaming functionality type node may be associated with "play music" and "play video" child (intermediate) nodes, and each of these child nodes may be associated with action nodes.

In the situation where no action are identified for a functionality type, a mock action node may be associated with the functionality type's node to inform the language model 108 that the functionality type is not currently supported by the system. As discussed herein above, his may mitigate hallucination issues where the language model 108 knows of a functionality but the system does not currently support it (e.g., no API or responding component 260 supports it at present).

Each node of the hierarchical data structure 300 may include various metadata 301 about the node. Exemplary metadata 301 can include a name and description for the functionality type, action, etc. to which it corresponds. For example, for a factual question answering functionality type node, the description may be "provides answers to a wide range of questions." For further example, for a smart home device control functionality type node, the description may be "controls state of various smart home devices." As another example, for a calendar management functionality type node, the description may be "manages events in electronic calendars." For further example, for an "create calendar event" action node, the description may be "creates events for electronic calendars. As another example, for a "generate email" action node, the description may be "generates emails requested in user inputs."

Exemplary metadata 301 can include information about its child node(s). For example, a functionality type node 305 (or intermediate node 320) may include the name of a child node, a description of the child node's function(s), and one or more exemplars of functions performable by the child node. Alternatively, a functionality type node 305 (or intermediate node 320) may include the name of a child node and a link to the child node's description and exemplar(s). Utilizing a link may decrease the amount of storage needed for the hierarchical data structure 300 as well as decrease the length of the hierarchical data structure 300 as represented within the prompt to the language model 108.

Exemplary metadata 301 can include one or more exemplars of functionality corresponding to the node. By including the exemplars in the nodes of the hierarchical data structure 300, the number of nodes to be traversed by the language model 108 may be reduced, thereby reducing latency at the action plan generation phase. Conceptually, these exemplars may resemble API calls. For example, a factual question answering functionality type node may include the exemplar "you need a factual answer to support the user input who is the president of the United States." For further example, a smart home control functionality type node may include the exemplar "use smart home control to support the use input turn on the living room light." These exemplars may be included in the prompt to the language model 108 (e.g., for in-context learning).

Exemplary metadata 301 can include one or more instructions, which may be incorporated into the language model prompt at inference. The instruction(s) may provide guidance to the language model 108 on how to utilize the functions that the child node(s) represents in order to complete objectives of the node. The instruction(s) may be in the form of natural language, pseudo code, or a semi-structured workflow description. For example, if "play [artist name]" is in a workflow, the instruction could be "first you need to use factual question answering to find out the specific entities that [artist name] might represent (e.g., album, song, etc.), and then you need to use media streaming to play that music." As another example, for "write an email to [name] to set a dinner reservation for [time]," the instruction could be "first you need to determine the user's intention to write an email, then you need to decompose the task into multiple steps, and then you need to generate a task for each of the multiple steps."

Exemplary metadata 301 can may include one or more exemplars for the one or more aforementioned instructions. The one or more exemplars may illustrate how the one or more aforementioned instructions may be applied in the reasoning process of the language model 108. Whereas an instruction may be generic (e.g., not tied to a specific use case), an exemplar may be specific to a user case. For example, for "write an email to [name] to set a dinner reservation for [time]," the instruction exemplar could be "first you need to utilize a contact service to identify an entity have the [name], then you need to generate an email to the entity requesting the booking of a reservation at [time], and then you need to use an email service to send the email." Instruction exemplars can be included in the prompt to the language model 108 to enable the language model 108 to generate its own step-by-step instructions for the current user input.

Nodes of the hierarchical data structure 300 may be added and removed over time to maintain an accurate representation of the system's capabilities.

The hierarchical data structure 300 may be generated through an automated approach using a language model (or other generative model) and supplemented by manual revisions. For example, a language model (or other generative model) can be prompted to generate the hierarchical data structure 300, where the prompt includes as context the system's capabilities in a non-hierarchical representation. Alternatively, the hierarchical data structure 300 may be generated manually.

In some examples, the hierarchical data structure 300 may be a tree structure, a directed acyclic graph, etc. The hierarchical data structure 300 may adopt a more flexible format than that described herein to accommodate evolving capabilities of the language model 108. For example, the hierarchical data structure 300 may take the form of natural language, semi-structured data, or pseudocode.

Referring again to FIG. 2, the system component(s) 220 may receive user input data 120. For example, the user input data 120 may include audio data representing a spoken natural language user input or utterance. In some examples, an ASR component 102 of the system may receive audio data representing a spoken natural language user input. The ASR component 102 may perform ASR processing on the audio data to determine ASR data representing the spoken user input, which may correspond to a transcript of the user input. As indicated above, the ASR component 102 can query a paralinguistic classifier (e.g., the classifier 104) that provides a paralinguistic caption characterizing the recording. Such a classifier is neural network model trained to assign a sentiment classification to the audio recording based on paralinguistic characteristics of the signal (e.g., cadence, intonation, etc.).

Figure 11:
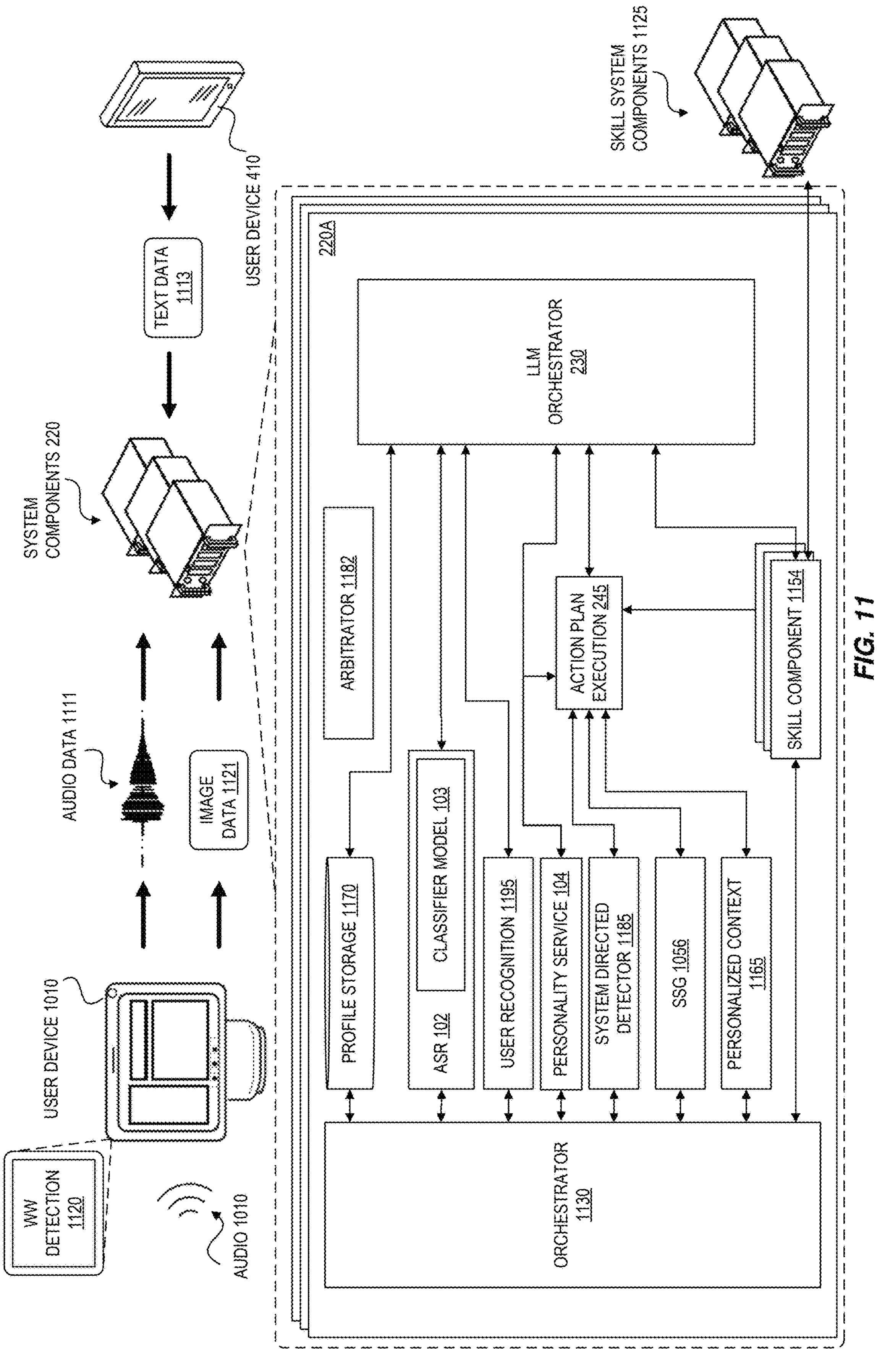
FIG. 11 is a diagram illustrating example components of the system, according to examples of the present disclosure.

As described herein with respect to FIG. 11, the ASR component 102 may determine ASR data that includes an ASR N-best list including multiple ASR hypotheses and corresponding confidence scores representing what the user may have said. The ASR hypotheses may include text data, token data, ASR confidence score, etc. as representing the spoken input. The confidence score of each ASR hypothesis may indicate a confidence of the ASR component 102 that the corresponding hypothesis represents what the user said. The ASR component 102 may also determine token scores corresponding to each token/word of the ASR hypothesis, where the token score indicates a confidence of the ASR component 102 that the user spoke the respective token/word. The token scores may be identified as an entity score when the corresponding token relates to an entity. In some instances, the user input data 120 may include a top scoring ASR hypothesis of the ASR data.

As an even further example, in some examples, the user input may correspond to an actuation of a physical button, data representing selection of a button displayed on a graphical user interface (GUI), image data of a gesture user input, a combination of different types of user inputs (e.g., gesture and button actuation), etc. In such examples, the system may include one or more components configured to process such user inputs to generate the text or tokenized representation of the user input (e.g., the user input data 120).

As a further example, the user input data 120 may include image data representing information being displayed at a user device (e.g., on-screen context data) when the user provides the user input or at substantially the same time as the user provides the user input.

As yet a further example, the user input data 120 may include audio data representing audio signals (e.g., background noise, audio from other devices such as TV, appliances, etc.) occurring in the environment of the user that can be captured by the user device (e.g., audio environment context).

As yet a further example, the user input data 120 may include image data representing one or more objects in the environment of the user (e.g., visual environment context).

In some examples, the system component(s) 220 may receive input data that may not be provided directly/explicitly by a user. Such other type of input data may be processed in a similar manner as the user input data 120 as described herein.

Such other type of input data may be received in response to detection of an event. Example events include change in a device state (e.g., front door opening, garage door closing, TV turned off, thermostat detecting a particular temperature, etc.), occurrence of an acoustic event (e.g., baby crying, appliance beeping, glass breaking, etc.), presence of a user (e.g., a user approaching a user device, a user entering a home, etc.), occurrence of an event indicated by a user (e.g., a reminder/notification requested by the user, sporting event score change, start of a TV program, calendar event, etc.), and others.

In some examples, the system may process the other type of input data and generate a response/output. For example, the input data may be received in response to detection of a user generally or a particular user, an expiration of a timer, a time of day, detection of a change in the weather, a device state change, etc.

In some examples, the input data may include data corresponding to the event, such as sensor data (e.g., image data, audio data, proximity sensor data, short-range wireless signal data, etc.), a description associated with a timer, the time of day, a description of a change in weather, an indication of a device state that changed, etc.

The system may include one or more components configured to process the input data to generate a natural language representation of the input data.

The recognized text and paralinguistic caption 112 is sent to the language model orchestrator 230.

The prompt generation component 240 receives (steps 1 and 2) the text with paralinguistic caption 112 and the hierarchical data structure 300 and determines prompt data 242 for the language model 108. The prompt data 242 may include natural language (e.g., a natural language request, a natural language instruction, etc.). In some examples, the prompt data 242 may include information in a manner that the language model 108 is trained for. Additionally, the prompt generation component 240 sends a request for static SATE instructions 241 to the personality service personality service 106. The request can include the recognized text and paralinguistic caption 112 and one or more metadata items related to the user input data, such as user preferences, location of the user device, etc. Upon receiving the request 241, the personality service 106 compiles (or selects) the static instructions and sends them to the prompt generation component 140. Additionally, the personality service can begin processing the request to determine an estimate of the user's actual sentiment for later use in selecting the dynamic SATE instructions. The prompt generation component 140 receives (step 3) the static SATE instructions 124 from the personality service 106.

The prompt generation component 240 sends (step 4) the prompt data 242 to the language model 108. The prompt data 242, as input to the language model 108, includes the user input data 120 (or a representation of the user input data 120), the hierarchical data structure 300 in a format traversable by the language model 108, and a request or directive for the language model 108 to generate an action plan for responding to the user input. The prompt data 242 can also include the static SATE instructions 124. In some examples, the prompt data 242 may include one or more action plan exemplars (e.g., in-context learning exemplars). To generate the prompt data 242, the prompt generation component 240 may curate node information from the hierarchical data structure 300 and fill in a template with different fields of node information.

The prompt data 242 may include indicators (e.g., labels, specific tokens, etc.) to identify certain information. In example examples, the prompt data 242 may include a "user" indicator (to indicate that the following string of characters/tokens are the user input), an "exemplar" indicator (to indicate exemplars), and so on.

The language model 108 processes the prompt data 242 to generate action plan data 244. In examples, the language model 108, by traversing the hierarchical data structure 300, decomposes the user input into tasks and determines one or more dependencies for the tasks (i.e., determines an order/sequence in which the tasks are to be performed), including whether certain tasks can be performed in parallel. The language model 108 (e.g., through instructions and instruction exemplars in the hierarchical data structure 300 (as represented in the prompt data 242)) figures out how to use the system's capabilities in the hierarchical data structure 300 to generate the action plan to respond to the user input. Instructions and instruction exemplars may provide the language model 108 with guidance on how to figure out processing dependencies, rather than the language model 108 having to rely solely on its own parametric capabilities.

The action plan data 244 may be in the form of natural language or pseudocode, with the latter potentially being advantageous for depicting complex dependencies more clearly and succinctly.

The action plan data 244 may indicate one or more actions (e.g., APIs, functions, etc.) to be performed/invoked to fulfill a user request. The action plan data 244 may indicate the data types needed to perform an action represented therein. The action plan data 244 may represent an action as an API/function request, API/function description, request to a responding component 260, etc. Example actions that may be included in the action plan data 244 may relate to obtaining certain information like context data, user profile data, user preferences, available/relevant exemplars, available/relevant APIs, etc. For example, a smart home functionality type node may be associated with a "turn on light" child node, which may include information stating, "to turn on a light, you need to know which light to turn on." The "turn on light" node may be associated with a "get devices associated with the user" API child node. The "turn on light" node may also be associated with an "obtain device state" API child node usable to obtain device states of the devices associated with the user. The "turn on light" node may additionally be associated with a "turn on light" API child node corresponding to an API(s) that receives a device identifier(s) or a device(s) to "turn on."

Types of context data that may be indicated in the action plan data 244 include, but are not limited to user context (e.g., user location, user profile identifier, user demographics, user profile data, user preferences, personalized catalogs, enabled skills/applications, etc.), device context (e.g., device type, device identifier, device location (e.g., living room, kitchen, office, etc.), device capabilities, device state, etc.), environmental context (e.g., time/date the past user input was received/processed, device that received the user input, device that responded to the user input, objects proximate to the device/user, background audio/noises, state/status of device(s) in the user's environment (e.g., TV is on, thermostat temperature, etc.)), and dialog context (e.g., prior user inputs of a dialog, prior system responses of the dialog, dialog topic, actions performed during the dialog, etc.). As an example, if the user input data 120 corresponds to operation of a device (e.g., the user input corresponds to a smart home functionality type), the action plan data 244 may indicate device context information, in particular device states for the devices associated with the user/user profile of the user, may be relevant information. As another example, if the user input data 120 corresponds to output of media, such as music, movies, TV shows, etc., the action plan data 244 may indicate user context information, in particular user preference for media genre associated with the user/user profile of the user, may be relevant information.

Based on the type of context data determined to be relevant, the language model 108 may output the action plan data 244 to include a request for the type(s) of context data. For example, if device context is relevant information, then the action plan data 244 may include an API call/description corresponding to a component (e.g., a device state component, a smart home component, a user profile storage, etc.) capable of providing device information. As another example, if user context is relevant information, then the action plan data 244 may include an API call/description corresponding to a component (e.g., a user profile storage, a personalized context component, etc.) capable of providing user information.

In some examples, an action, in the action plan data 244, may be associated with one or more responding components 260, or types of responding components 260, that may be relevant for performing the action. As an example, if the user input data 120 corresponds to operation of a device (e.g., the user input corresponds to a smart home domain), the action plan data 244 may indicate one or more device operation responding components. As another example, if the user input data 120 corresponds to output of media, the action plan data 244 may indicate one or more media output responding components.

The language model 108 may output (step 5) the action plan data 244 to the action plan reasoning component 250, which is configured to strategically cause one or more actions in the action plan data 244 to be executed. The action plan reasoning component 250 processes the action plan data 244 and determines which one or more actions therein are to be executed at present. For example, the action plan reasoning component 250 may determine which one or more actions in the action plan data 244 are not dependent upon the performance of any other action in the action plan data 244.

The action plan reasoning component 250 generates action(s) data 251 representing the one or more actions from the action plan data 244. The action(s) data 251 includes, for each action represented therein, an identifier of a responding component 260 capable of performing the action. that the action plan reasoning component 250 determined is/are to be performed at present. In some situations, the action(s) data 251 may correspond to a portion of the actions represented in the action plan data 244. In other situations (e.g., where all actions in the action plan data 244 are capable of being performed independently of all other actions in the action plan data 244), the action(s) data 251 may represent all actions indicated in the action plan data 244.

The action plan reasoning component 250 may send (step 6) action(s) data 251 to the action plan execution component 225. For each action in the action(s) data 251, the action plan execution component 225 may generate a corresponding action request 236 (e.g., API request) to perform the action, and may send (step 7A) the action request 236 to the responding component 260 whose identifier is associated with the action in the action(s) data 251. For example, the action plan execution component 225 may send a first action request 236*a* to a first responding component 260*a* to perform a first action represented in the action(s) data 251, a second action request 236*b* to a second responding component 260*b* to perform a second action represented in the action(s) data 251, etc. For example, if the action(s) data 251 indicates that device information/context needs to be obtained, then the action plan execution component 225 may generate an action request 236 for a responding component 260 capable of providing the device information, where the action request 236 may include a user profile identifier associated with the user, a device identifier associated with the user device, and/or other information based on information required in an API call for the responding component 260*a*.

The action plan execution component 225 may identify an API in the action(s) data 251 and generate an executable API call for the corresponding responding components 260.

In some cases, the action(s) data 251 may include one or more incomplete API calls and the action plan execution component 225 may be configured to generate one or more corresponding executable API calls (e.g., complete API calls). The action plan execution component 225 may generate one or more executable API calls including one or more parameters using information included in the action(s) data 251 and/or various other contextual information (e.g., speaker recognition results, a user ID, user profile information (e.g., age, gender, location, language, geographic marketplace, etc.), device ID, device profile information, device state indicators, a dialog history, and/or a interaction history associated with the user and/or the device, etc.). In some examples, the various contextual information may be contextual information not provided to the language model orchestrator component 230. Prior to generating the executable commands, the action plan execution component 225 may modify (e.g., remove, filter, preempt, etc.) a directive included in the action(s) data 251 that is determined to be in conflict with a system operating policy. The action plan execution component 225 may generate one or more additional executable commands corresponding to directives not included in the action(s) data 251.

The action request 236 may be sent (step 7A) to the corresponding responding component(s) 260. The responding component(s) 260 may include components that the action plan execution component 225 may communicate with via API requests or other type requests. As shown in and discussed with respect to FIG. 10 below, the responding component(s) 260 may include an API retriever component 1042, one or more skill/app components 1054, and a synthetic speech generation (SSG) component 1056 (e.g., configured to convert input data to audio data representing synthesized speech). The responding component(s) 260 may also include an orchestrator component 1130 (e.g., configured to facilitate processing by other system components shown in and discussed with respect to FIG. 11 below), a context source component (e.g., configured to provide user context data, device context data, environmental context data, dialog context data, personalized context data, etc.), a multimodal response component (e.g., configured to respond to a user input via outputs in more than one data form), a content moderation component (e.g., configured to moderate certain types of content such as biased content, harmful content, offensive content, etc.), a smart home devices component (e.g., configured to provide device information such as device state, device capabilities, etc.), a language model-based agent (e.g., a component that uses a language model (e.g., a LLM) or other type of generative model to provide information), an exemplar provider component (e.g., configured to respond to a query for relevant exemplars), a knowledge base component (e.g., including one or more knowledge bases or other structured data that can be searched to obtain information), an entity resolution component (e.g., configured to determine specific entities corresponding to entities represented in a user input or language model output), and the like.

In response to receiving the action request 236 (at step 7A), the responding component(s) 260 may provide (step 8A) an action response(s) 262 to the action plan execution component 225.

One of the actions in the(s) data 251 can be the retrieval of the dynamic SATE instructions 126. Such an action may be in a final language model iteration prior to prompting the language model to generate the response 128. The action plan execution component 225 can generate request 237 (e.g., API request) to retrieve the dynamic SATE instructions and send the request 237 (step 7B) to the personality service 106 (which may be considered a "responding component"). The personality service 106 can provide dynamic SATE instructions 126 (step 8B) based on the estimation of the user's actual sentiment, the calculation of which was previously initiated by the static request 241.

The information from the action response(s) 262 may be included in a prompt to the language model 108. The action plan execution component 225 may determine action plan response data 238 based on the action response(s) 262. The action plan execution component 225 may combine (e.g., aggregate, summarize, de-duplicate, etc.) multiple action responses 262 to generate the action plan response data 238. In some examples, the action plan response data 238 may be the same or similar to the action response(s) 262. In some examples, the action plan response data 238 may include an identifier associated with the responding component 260 that provided the action response 262. For example, the action plan response data 238 may include first weather information from a first weather skill component, second weather information from a second weather skill component, third weather information from a search engine component, etc. In some examples, the action plan execution component 225 may remove/filter information from the action response 262 that is determined to include information not beneficial to the processing by the language model 108.

The action plan execution component 225 may send (step 9) the action plan response data 238 to the prompt generation component 240. The prompt generation component 240 may generate an additional prompt based on the action plan response data 238, the action plan data 244, and the prompt data 242.

The additional prompt may be sent (step 10) to the language model 108 for processing. At this point, the language model 108 may perform the action generation phase of processing the result(s) of the already-performed action(s), which may involve interpreting or understanding the results included in the action plan response data 238. The language model 108 may generate an LM response 246 based on the additional prompt of step 10. The additional prompt may include a request or directive to the language model 108 to perform further processing with respect to the user input data 120. As described above, the additional prompt may provide, among other things, responses/results of performance of one or more actions included in the action plan data 244. The language model 108 may generate the LM response 246 to include a next action(s) to be performed (as part of the action generation phase) or may generate a (final/user-facing) response 128 to the user input data 120 (as part of the response generation phase).

The LM response 246 may be a natural language output. The LM response 246 may include text tokens. In other examples, where the language model 108 may be a multi-modal model, the LM response 246 may include other types of tokens, for example, audio tokens, image tokens, etc.

The LM response 246 may be sent (step 11) to the action plan reasoning component 250. In the situation where the LM response 246 includes a next action(s) to be performed, the action plan reasoning component 250 and the action plan execution component 225 may process as described herein above to provide the prompt generation component 240 with another action plan response based on the indicated next action(s), and the prompt generation component 240 may prompt the language model 108 based on the additional action plan response to cause the language model 108 to produce another LM response.

The processing described above may be performed iteratively until the language model 108 generates an LM response including a (final/user-facing) response 128 to the user input data 120. The language model 108 may determine the final response based on the results included in action plan response data. For example, the language model 108 may summarize the results, may combine the results, may generate an interpretation of the results, etc. In a non-limiting example, the language model 108 may combine weather information from two or more responding components (e.g., combine high/low temperature information from a first responding component with humidity information from a second responding component). In another non-limiting example, the language model 108 may interpret results from a knowledge base component to determine a response to the specific user query (e.g., from a biographical search result for a historical person, a birthplace and siblings information may be extracted to determine a response to a user query "tell me about [person's] childhood").

As indicated above, in some examples, the action of fetching the dynamic SATE instructions 126 can be included in an action prior to prompting the language model 108 to determine the final response. In this manner, the dynamic SATE instructions 126 can be included with the prompt to determine the final response based on the results included in the action plan data.

In some examples, the language model 108 may generate an output requesting additional (e.g., clarifying) information from the user. Such a request, in some examples, may be labeled as "Response" so that the action plan reasoning component 250 may cause the request to be output to the user.

In situations where the LM response 246 indicates one or more actions to be performed, the LM response 246 sent to the action plan reasoning component 250 may label the further task(s) to be executed with "Action." In situations wherein the LM response 246 includes a final response to be output the user, the LM response 246 may include the label "Response."

Based on the tokens corresponding to the "Action" label, the action plan reasoning component 250 may determine the LM response 246 to include one or more actions to be performed. Based on the tokens corresponding to the "Response" label, the action plan reasoning component 250 may determine the LM response 246 to include one or more actions, one or more API calls and/or one or more responding components 260 to present the output tokens to the user as a response to the user input. For example, the LM response 246 may include an identifier for the responding component 260 capable of generating outputs in more than one form (e.g., a multi-modal output component) to cause the tokens to be presented as synthesized speech, displayed text/graphics, and/or other types of outputs.

In some examples, the prompts for the language model 108 described herein may include a request for the language model 108 to output a response that satisfies certain conditions. Such conditions may relate to generating a response that is unbiased (toward protected classes, such as gender, race, age, etc.), non-harmful, profanity-free, etc. For example, prompt data generated by the prompt generation component 240 may include "Please generate a polite, respectful, and safe response and one that does not violate protected class policy."

In some examples, a prompt to the language model 108 may include the processing phase (e.g., the task generation phase, the action generation phase, and the response generation phase) that the language model 108 is to perform. In some examples, for the task generation phase, a prompt may direct the language model 108 to generate an output (e.g., tokens) representing the model's interpretation of the user input and/or one or more tasks to be performed to respond to the user input (the model output may be, for example, the user is requesting [intent of the user input], the user wants to [desired user action], need to determine [information needed to properly process the user input], etc.). For the task generation phase, a prompt may also direct the language model 108 to prioritize a list of tasks to be performed, if more than one task is to be performed and select one (or more) task for the current iteration of processing.

In some examples, for the action generation phase, a prompt may direct the language model 108 to generate an output (e.g. tokens) representing an action(s) (or directive(s)) and/or an API call(s) corresponding to the user input, where performance of the action(s) or execution of the API(s) can be done to retrieve information to determine a response to the user's input, perform the user requested action, retrieve information/data to perform other tasks on the task list, etc. In some examples, for the action generation phase, the prompt may direct the language model 108 to process the results of the action(s)/API(s) determined by the language model 108, and to determine whether a response to the user input can be generated or whether there are further tasks to be performed from the task list.

The system of the present disclosure may implement processing that facilitates: (1) integration of hierarchy and node information from the hierarchical data structure 300 into prompts; (2) guidance of the language model 108 to dynamically create action plans at the node level, which enables navigation through the hierarchy of the hierarchical data structure 300 to gather API information and initiate calls needed for action plan execution; and (3) decision-making regarding the status of the action and the potential to revert to earlier phases of planning for necessary modifications.

The system may process a user input in a manner that dynamically adapts based on feedback from the language model 108 and insights from previous processing iterations. The action plan reasoning component 250 may make real-time adjustments and decisions to navigate effectively toward task completion. The action plan reasoning component 250 may implement a function that assigns a task extracted from a prompt history to a current node of the hierarchical data structure 300 and produced an updated prompt history, along with a potentially updated node that signifies the current context or position where reassignment and re-planning may be necessary. The prompt history may include all steps taken (e.g., nodes, their assigned task, the action plan, etc.), decisions made, and outcomes achieved during the execution process.

Figure 4:
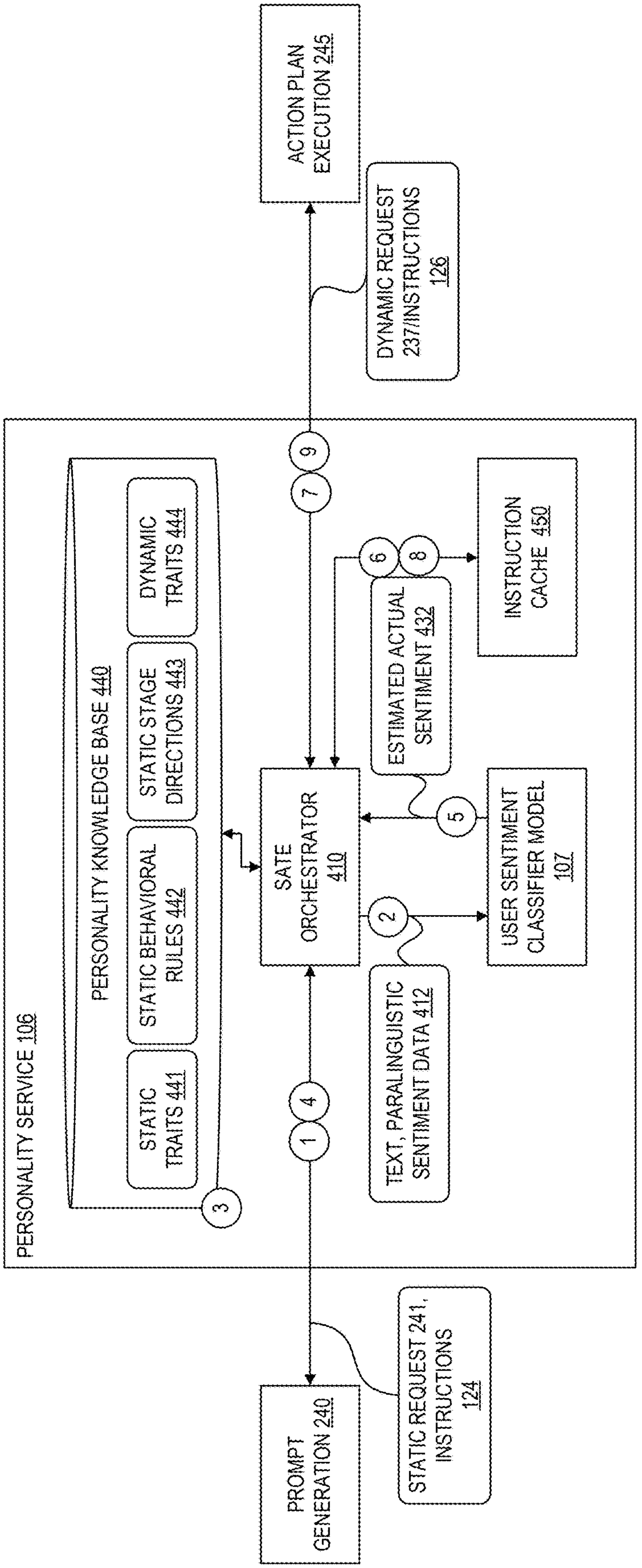
FIG. 4 is a diagram illustrating example components and processing of a personality service component of the system, according to some examples of the present disclosure.

FIG. 4 is a diagram illustrating example components and processing of a personality service component of the system, according to some examples of the present disclosure. In this example, the personality service 106 includes a personality service orchestrator 410 that manages the selection and sending of SATE instructions in response to requests 241, 237.

The personality service 106 can include or have access to a personality knowledge base 440, the knowledge base storing static and dynamic SATE instructions. As indicated, static SATE instructions can include traits 441 and rules 442, which may be global or locale-specific. Other static SATE instructions can include stage directions 443, which also may be global or locale-specific.

Upon receiving a static SATE instruction request 241 (step 1) from the prompt generation component 240, the personality service orchestrator 410 selects one or more instructions to include in the static SATE instructions 124 from the personality knowledge base 440 (step 3) that are applicable to the request. As indicated, the request 241 can include the text transcript and paralinguistic caption of the user's request, as well as metadata items related to the user input data such as the location of the user device that recorded the user's request, user preferences, etc. In some examples, the personality service orchestrator 410 can select any global instructions and any locale-specific instructions applicable to the location associated with the request. In some examples, the personality service orchestrator 410 can instructions applicable to the user's preferences. For example, certain instructions (either local, global, or a separate set of instructions) may be tagged as associated with a particular persona. If a user has indicated a preference to have the user device emulate one of these personas, the rules, traits, or other static instructions associated with that persona can be selected. In some cases, the user preferences might override location specific preferences, depending on the implementation. Once the personality service orchestrator 410 has compiled a set of static SATE instructions applicable to the request, it can send those static instructions 124 to the prompt generation component 240.

Additionally, a static SATE instruction request 241 (step 1), the personality service orchestrator 410 can submit the text transcript and paralinguistic caption of the user's request to the user sentiment classifier model 107 (step 2) to begin the processing time by the classifier model 107. The personality service orchestrator 410 can store data included in or about the request 241, such as an identifier to track the estimated actual sentiment of the user when available. For example, the user request may be associated with a request identifier included in the metadata which the personality service orchestrator 410 can store and associated the estimated actual sentiment with for later retrieval by the action execution plan component 245. As another example, the personality service orchestrator 410 may generate an identifier associated with the request 241 and return that identifier with the static instructions 124 to the prompt generation component 240. The identifier (whether assigned to the user request or generated for the request 241 can be passed through the LM 108 and included as a reference that can be later used to identify the estimated actual sentiment.

Once the user sentiment classifier model 107 completes inference of the user's estimated actual sentiment 432 (step 5), the personality service orchestrator 410 can select one or more dynamic instructions based on the estimated actual sentiment 432 from the personality knowledge base 440. For example, the personality knowledge base 440 can include dynamic traits that are contingent on the estimated actual sentiment 432 of a request. The personality service orchestrator 410 can pull these dynamic instructions and store them along with the identifier in an instruction cache 450 or other storage location (step 6). In some examples, the estimated actual sentiment 432 may also be stored. For example, the cached data may include dynamic instructions associated with the request 241 as follows:

```
## Dynamic Situational Guidance
User's Estimated Actual Sentiment: [sentiment 1]
IMPORTANT: The user's real sentiment is [description of sentiment
1], respond emphasizing [one or more traits].
```

In some examples, the dynamic instructions may also be dependent on user preferences and/or the location of the user device. For example, the appropriate tone for response given a user's particular sentiment in one country might be different than the appropriate tone to adopt for another user with that sentiment in a different country.

Sometime later, e.g., after the LM has iterated over one or more rounds traversing a hierarchical data structure and reached an action to retrieve the dynamic SATE instructions, the action plan execution component 245 can send a request 237 for the dynamic SATE instructions (step 7). The request can include the identifier to locate the dynamic SATE instructions associated with the particular user request. Upon receiving the request 237, the personality service orchestrator 410 can use the identifier to retrieve the cached dynamic SATE instructions from the instruction cache 450 (step 8) that were selected for the particular user request. The personality service orchestrator 410 can send the cached dynamic SATE instructions 126 to the action plan execution component 245 (step 9).

Figure 5:
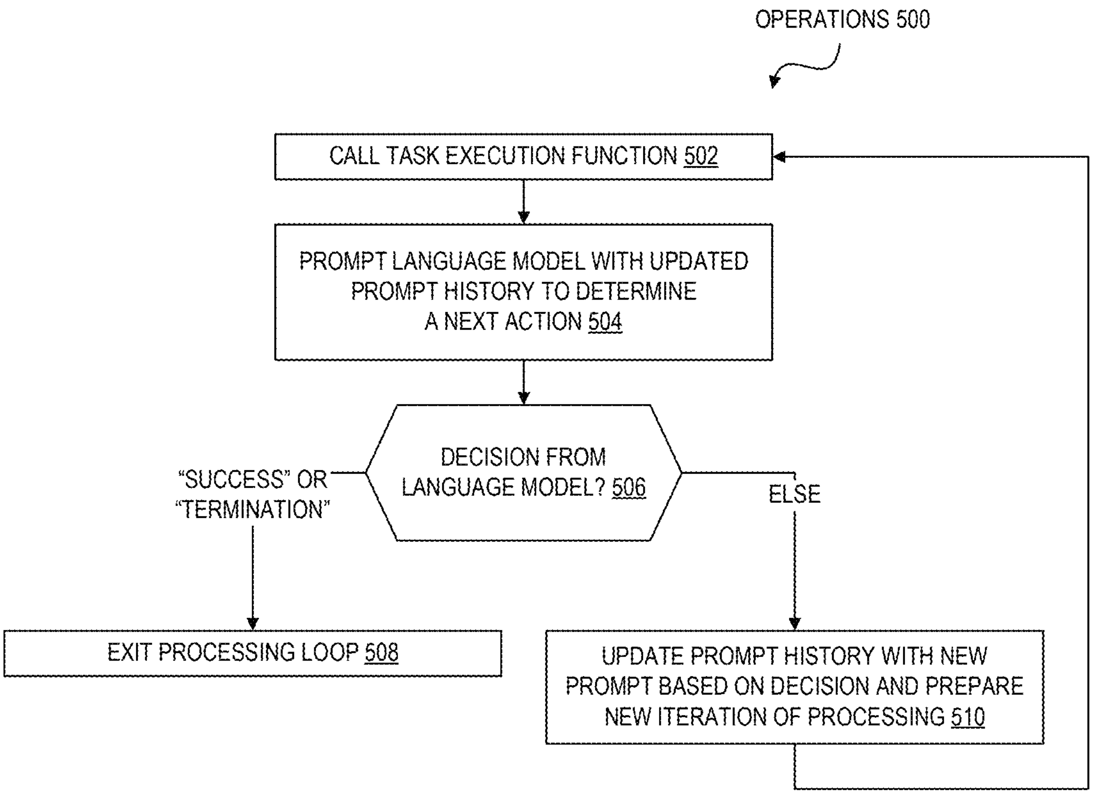
FIG. 5 is a flow diagram illustrating example operations of a method for processing a user input using a language model, according to examples of the present disclosure.

FIG. 5 is a flow diagram illustrating example operations 500 of a method for processing a user input using a language model, according to examples of the present disclosure. The action plan reasoning component 250 may execute an action by calling (step 502) a task execution function. The task execution function may utilize information about the task to be performed and a prompt history (including the prompts input to the language model 108 thus far) in order to execute the task. The task execution function may be called to perform the current task and update the prompt history with the outcome(s) and potentially update the action plan data 244 based on the outcome(s). Further details of the task execution function are described herein below with respect to FIG. 6.

After the task execution function is completed (e.g., steps 6-9 of FIG. 2 are completed), the prompt generation component 240 may prompt (step 504) the language model 108 with the updated prompt history to determine a next action to be performed. The language model 108 thereafter outputs a decision on the next action and the method includes determining (step 506) the decision of the language model 108.

If the language model 108 outputs a "success" or "termination" decision, the processing loop is exited (step 508), thereby ending execution with respect to the user input. Conversely, if the language model 108 outputs a decision other than "success" or "termination" (e.g., outputs "fallback"), the prompt generation component 240 may update (step 510) the prompt history with a new prompt based on the decision and prepare a new iteration of processing. That is, the prompt generation component 240 may prompt the language model 108 using the new prompt to determine a next action(s) to be performed, and the action plan reasoning component 250 may again call the task execution function with respect to the next action(s) to be performed.

In some examples, the system may implement a max iterations threshold. In such examples, prior to re-executing the task execution function, the prompt generation component 240 may increment the number of iterations by one (1) and determine whether the present number of iterations is less than the max iteration threshold. If the present number is less than the threshold, then the prompt generation component 240 may prompt the language model 108 with the new prompt. Conversely, if the present number of iterations equals the max threshold, the prompt generation component 240 may cause the processing loop to be exited, thereby ending execution with respect to the user input.

Figure 6:
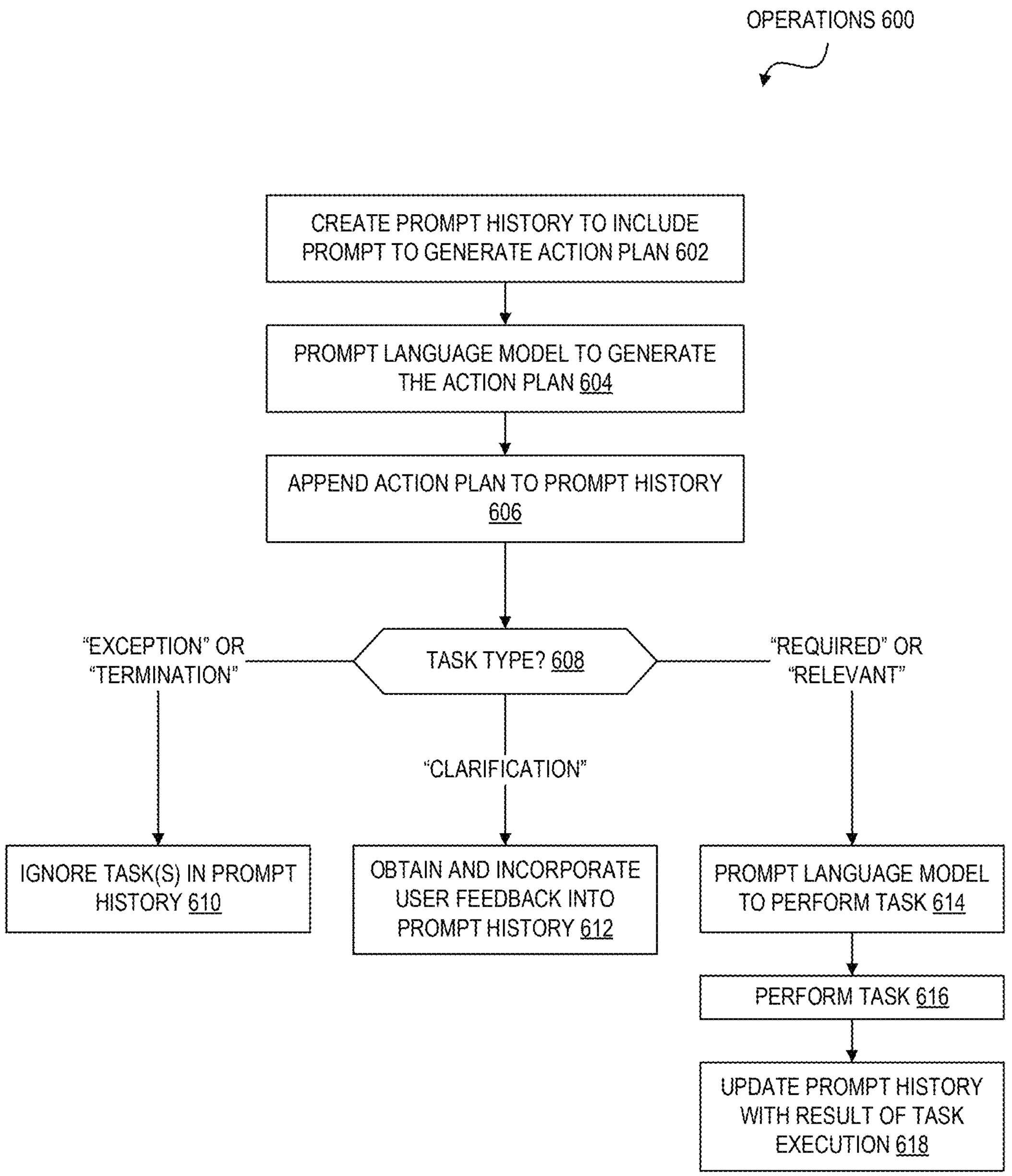
FIG. 6 is a flow diagram illustrating example operations of a method for the task execution function of FIG. 5, according to examples of the present disclosure.

FIG. 6 is a flow diagram illustrating example operations 600 of a method for the task execution function of FIG. 5, according to examples of the present disclosure. The prompt generation component 240 creates (step 602) a prompt history to include the prompt data 242 to generate the action plan data 244. That is, the prompt history is created to include the information from the hierarchical data structure 300.

The prompt generation component 240 then prompts (step 604) the language model 108 to generate the action plan data 244, informed by the unique capabilities of the hierarchical data structure 300. The steps of the action plan data 244 may incorporate conditional dependencies necessary for task completion, such as if-then relationships.

The action plan reasoning component 250 may then append (step 606) the action plan data 244 to the prompt history, which may be maintained in a storage associated with the processing of the current user input data 120. The storage may be a temporary storage that may store processing data and that may be discarded once a response to the user input data 120 is presented to the user.

The task execution function may proceed with the action plan reasoning component 250 identifying task in the action plan data, assigning actions to them, and initiating step-by-step execution of interdependent actions. To this end, the action plan reasoning component 250 may determine (step 608) task types in the prompt history (and more particularly the action plan data as represented in the prompt history). For any task labeled as "exception" or "termination" in the prompt history (i.e., in the action plan data therein), the action plan reasoning component 250 may ignore (step 610) the task(s). For any task labeled as "clarification" in the prompt history (i.e., in the action plan data therein), the action plan reasoning component 250 may cause (step 612) user feedback to be obtained and thereafter incorporate the user feedback into the prompt history with respect to the "clarification" task. For a "required" or "relevant" task in the prompt history (i.e., in the action plan data therein): the action plan reasoning component 250 may cause the prompt generation component 240 to prompt (step 614) the language model 108 to perform the task; the language model 108, action plan reasoning component 250, and action plan execution component 225 may process as described herein to perform (step 616) the task; and thereafter the prompt generation component 240 may update (step 618) the prompt history with the result of the task execution.

A distinctive feature of the function of FIG. 6 is its ability to execute independent tasks in parallel (or substantially in parallel), thereby improving efficiency. Tasks may be differentiated by their complexity: simple tasks (e.g., those corresponding to leaf nodes in the hierarchical data structure 300) may be executed directly in a controlled environment, or "sandbox," while more complex tasks may be processed through recursive execution. Additionally, the function may diligently log each action and outcome, creating an exhaustive record that streamlines future executions by avoiding repetitive processes.

As used herein, a "sandbox" refers to a controlled environment having access to defined data storage and which does not dynamic context data. Within a sandbox, the prompt to a language model (or other generative model) may consist of a request, set context information, and node information from the hierarchical data structure 300. The language model's (or other generative model's) output to the prompt may indicate a specific action to be performed (e.g., API to be called). Within the sandbox, a responding component 260 may be sent an action request corresponding to the action (e.g., an API call corresponding to the API), the responding component 260 may return an action response (e.g., an API-returned value), and the language model (or other generative model) may be prompted to summarize the action response. The output of the sandbox may be used to update the prompt history discussed above.

The language model (or other generative model) within the sandbox may be smaller and faster than the language model 108 and may optionally be finetuned for one or more particular tasks.

Recursive execution allows the language model 108 to terminate processing or fallback to re-plan (i.e., update the action plan) because of some observation that makes the language model 108 rethink about the action plan data 244 that was initially generated and appended to the prompt history.

The following are some example workflows utilizing the task execution function of FIG. 6. The example user input "turn on my lawn sprinkler if it doesn't rain tomorrow" demonstrates how the task execution function can manage multi-step actions that depend on the outcomes of preceding steps. The initial interaction prompts the language model 108 to generate an action plan for the user input using the hierarchical data structure 300. The language model then creates an action plan that includes "Step 1" and "Step 2." Step 1 of the action plan could correspond to "factual_qa," leaf node in the hierarchical data structure 300, and thus executed in a sandbox. Following the outcome of Step 1, the prompt history is updated, and execution proceeds to Step 2 of the action plan. At this stage, the prompt includes the outcome of the Step 1 processing, options to determine if exit criteria are met, and information (from a "media_and_smart_home_control" node of the hierarchical data structure 300 to which Step 2 corresponds) guiding the language model 108 to a next action. The language model 108 may opt to perform the "media_and_smart_home_control" action to "turn on the lawn sprinkler."

The following is an example of the task execution function of FIG. 6 being applied to the user input "play [title]." This scenario involves recursive invocation of the task execution function due to the need for traversing multiple layers of the hierarchical data structure 300 during task execution (e.g., Media-Control→("Play Music", "Play Video")). The initial interaction prompts the language model 108 to generate an action plan for the user input using the hierarchical data structure 300. The language model 108 then constructs an action plan comprised of Step 1, Step 2, and Step 3. Step 1 may correspond to a "search_capability_for_media_content" of the hierarchical data structure 300 and a sandbox may be employed for its processing. This may return an outcome of {"ID1": {"title": "[title]", "type": "Movie", "genres": ["Animation", "Adventure", "Comedy"]}, "ID2": {"title": "[title]", "type": "Album", "artist": "Various Artists", "genres": ["Soundtrack", "Film Score"]}}. Similarly, Step 2 may correspond to another "search_capabilities_for_devices" leaf node of the hierarchical data structure 300, yielding an outcome of {"Device1": "Supports Music playing only", "Device2": "Playing Video Right now"}. Steps 1 and 2 are independent and can be executed in parallel. Thus, when processing Step 3 in the task execution function, the prompt may incorporate execution outcomes from Steps 1 and 2. In the recursive invocation of the task execution function the language model 108 is presented with options to determine if the exit criteria have been met and receives information from a node "media_and_smart_home_control" of the hierarchical data structure. It is prompted to choose the next step in the action plan (i.e., among the child nodes of "Music Streaming" and "Video Streaming") based on instructions from Step 3. The language model 108, in this example, then decides to use "Video Streaming" to play ID1 on Device2, deducing that [title], identified by ID1, is a movie and that Device 2 is currently equipped for video playback. A subsequent step could trigger a sandbox execution if sufficient API information is possessed to complete the task of playing [title] (e.g., a leaf node in the hierarchical data structure).

The effectiveness and scalability of the teachings disclosed herein may be linked to the capabilities of the language model 108. Despite advancements in language models, their ability to comprehend context, generate precise action plans, and make informed decisions may restrict utility of the present disclosure's teachings, especially for tasks demanding specialized knowledge or reasoning. The hierarchical data structure's organizational and hierarchical structure may aid the language model 108 in breaking down tasks and managing the complexity of subtasks based on node definitions within the hierarchical data structure 300. This setup enables the injection of specific instructions to guide decision-making of the language model 108 in a way that remains within the capabilities of the language model 108. To further mitigate risks, instructions and instructional exemplars provided by experts may be utilized. This instructional data may aid in offline language model fine-tuning and online prompt construction, enhancing the language model's ability to follow instructions more effectively.

To address complexity concerns, it may be beneficial to manage the depth of the hierarchical data structure 300, allowing for the consolidation of multiple layers therein. This consolidation could enable the language model 108 to perform multiple inference passes in one go, leverage fine-tuning (e.g., SFT+LHF) to lessen prompt dependency due to the stable and limited number of functionalities. Simple chaining logic, such as search-and-act followed with initiatePlayback, may be delegated within a leaf node. Adjusting the user experience design, such as informing users about the outcomes of conditional dependencies, may also help mitigate risks.

Incorporating intelligent task management into the reasoning processes to track completed, successful, and failed subtasks and make more targeted adjustments may be beneficial. Handcrafted rules can be implemented to organize prompt history and selectively determine which historical information to include in task execution. Additionally, rules may be used to prevent looping execution in the language model 108 and design execution strategies that consider the language model's capabilities, user experience, latency, and the complexity of these rules.

The hierarchical data structure 300 may be accessed during an API onboarding process, potentially reducing workload and streamlining the identification of capabilities that an API depends on for integration. With the hierarchical data structure 300, an API may be registered under a specific functionality associated with a leaf node. To maintain system simplicity and manage the onboarding process efficiently, the number of hierarchies and nodes may be limited within the hierarchical data structure 300. This structured hierarchy may assist in more effectively identifying APIs managed by other entities. The language model 108, itself, may be leveraged for registration suggestions. This will allow for the addition of new leaf nodes to the hierarchical data structure 300 for specific user experiences.

Figure 7:
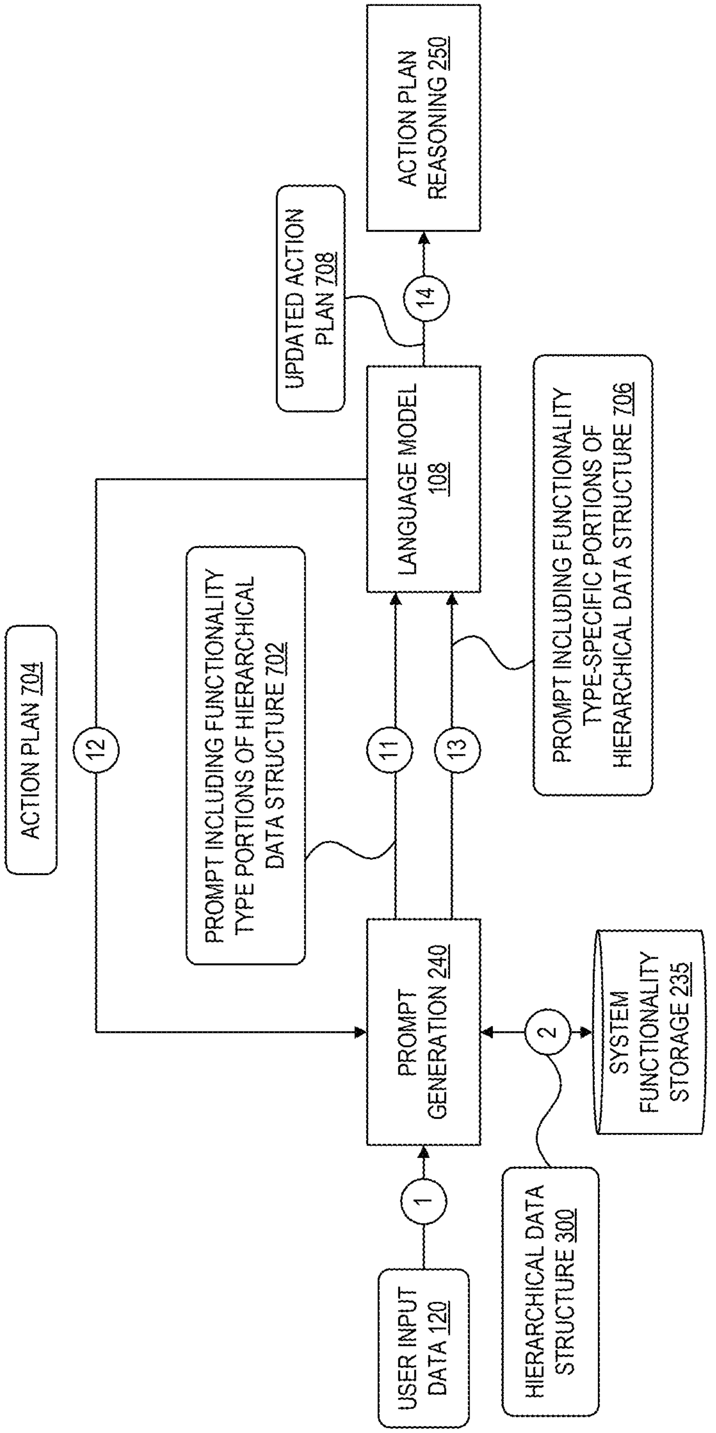
FIG. 7 is a diagram illustrating iterative prompting of the language model to generating an action plan, according to examples of the present disclosure.

FIG. 7 illustrates an example of how the language model 108 may be prompted more than once to generate an action plan for responding to a user input. The prompt generation component 240 may receive (step 1 from FIG. 2) the text request 112 of the user and may receive (step 2 from FIG. 2) the hierarchical data structure 300.

The prompt generation component 240 sends (step 11) prompt data 702 to the language model 108. The prompt data 702 includes the text request 112 of the user (or other representation of the user input data 120), the information of the functionality type nodes 305 of the hierarchical data structure 300, and a request or directive for the language model 108 to generate an action plan for responding to the user input based on the information of the functionality type nodes 305.

The language model 108 thereafter generates action plan data 704 including one or more tasks for responding to the user input. The language model 108 may send (step 12) the action plan data 704 to the prompt generation component 240.

The action plan data 704 may include one or more tasks for responding to the user input, where each of the one or more tasks corresponds (e.g., is associated with) a corresponding functionality type. After receiving the action plan data 704, the prompt generation component 240 may determine the child node(s) corresponding to (e.g., associated with) the functionality type(s) represented in the action plan data 704. The prompt generation component 240 may generate prompt data 706 including the action plan data 704, information for the aforementioned child node(s), and a request to or directive for the language model 108 to update the action plan for responding to the user input based on the child node(s) information.

The prompt generation component 240 sends (step 13) the prompt data 706 to the language model 108 and the language model 108 thereafter generates updated action plan data 708 including one or more refined tasks and/or actions for responding to the user input. The language model 108 sends (step 14) the updated action plan data 708 to the action plan reasoning component 250, and the action plan reasoning component 250 thereafter processes as described herein above with respect to FIG. 2. (The updated action plan data 708 may be analogous to the action plan data 244 of FIG. 2.)

Figure 8:
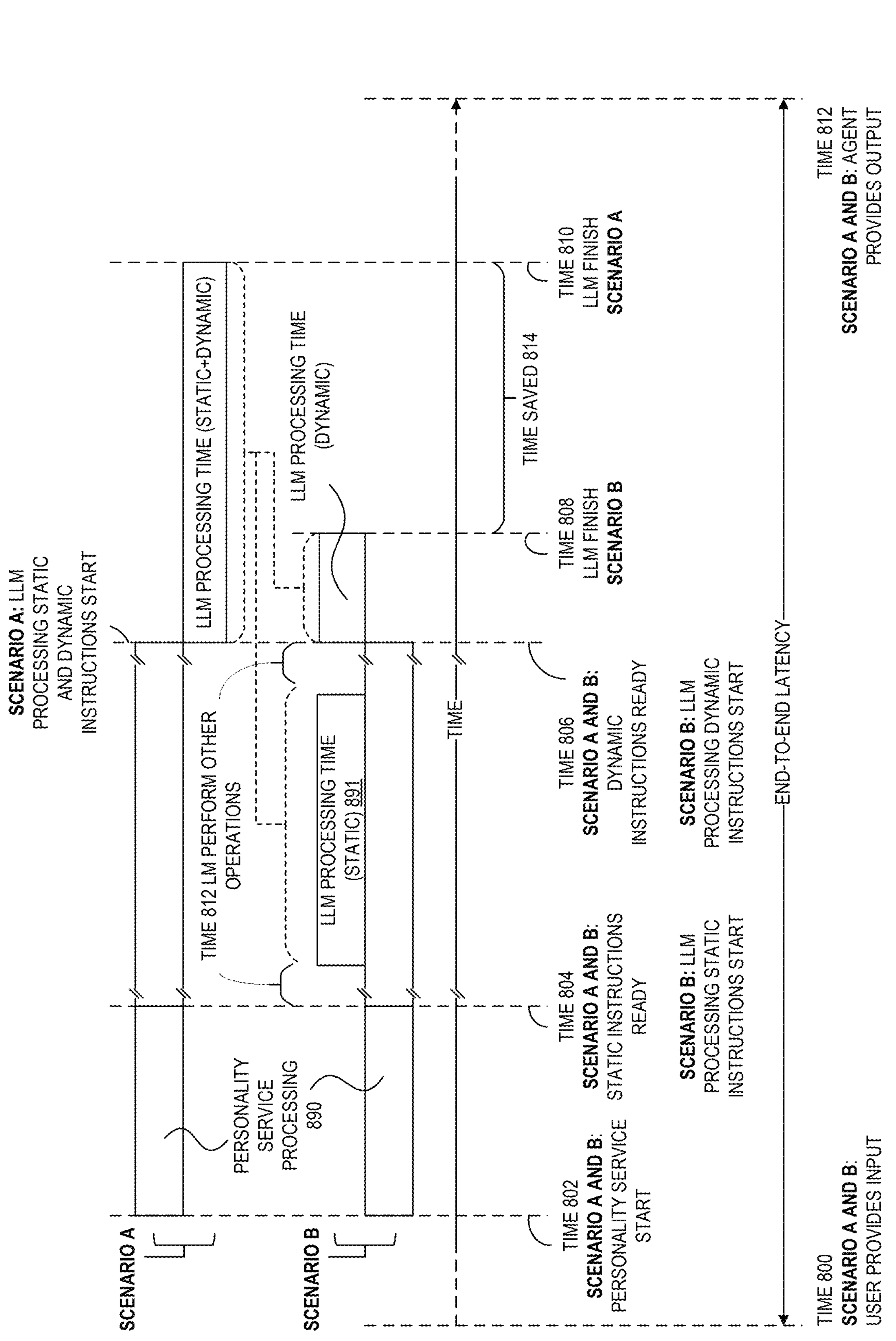
FIG. 8 is a diagram illustrating timing considerations with respect to the end-to-end latency of a conversational agent system, according to some examples of the present disclosure.

FIG. 8 is a diagram illustrating timing considerations with respect to the end-to-end latency of a conversational agent system, according to some examples of the present disclosure. In this diagram, time is represented horizontally, advancing from left to right. Note that the various amounts of time described below are meant to be illustrative and not drawn to scale, with the beginnings and endings of various periods of time not necessarily reflective of the beginnings and endings or relationships thereof between processes. The end-to-end latency of the system can be viewed as the time 800 at which the user provides an input (e.g., 120) to the time 812 at which the CA provides an output (e.g., response 128 post-rendering at the user device). Contributing to this end-to-end latency is the processing time 890 of the personality service 106 (abbreviated "PS" in this diagram) described herein.

Two scenarios are shown, one, scenario A, in which the static and dynamic SATE instructions are fully generated before being submitted to the LM, and another, scenario B, in which the personality service 106 provides the static instructions and sometime later provides the dynamic instructions, such as described with reference to FIG. 4. Beginning with scenario A, at time 802 the personality service begins its operations to generate static and dynamic instructions. In this scenario, the static and dynamic instructions are not submitted to the LM until at least time 806 when both are ready. At that time 806, the LM begins processing those instructions, finishing at time 810.

Turning to scenario B, again at time 802 the personality service begins its operations to generate static and dynamic instructions. At time 804, the static instructions are ready, which is typically before the dynamic instructions given the static instructions independence of the estimated actual sentiment of the user and associated processing time to generate that estimation (e.g., by the user sentiment classifier 107). Rather than wait for that estimation, the personality service 106 can provide the static instructions for submission to the LM at time 804. Then, after the user's actual sentiment has been estimated instructions are ready, the personality service 106 can provide the dynamic instructions for submission to the LM at time 806. In this manner, LM processing time associated with processing the static instructions 891 is shifted to at least a portion of the time during which the SATE instructions have yet to be determined. These static instructions can precondition (or "prime") the LM for the subsequent prompt requesting a response and including the dynamic instructions (e.g., through KV caching in attention-based LMs). Additionally, the LM is free to perform other operations in response to other prompts during the time 812 before the dynamic instructions are ready.

Note that while the personality service 106 description herein generally contemplates the separate provisioning of the static and dynamic instructions (scenario B), other examples may submit the static and dynamic instructions together (scenario A) at the cost of an increased end-to-end latency while still providing SATE to the CA, such as when the classifier providing the estimation of the user's actual sentiment has a small latency. This latter approach reduces the end-to-end latency by the time savings 814 (approximately the difference between the operations of scenario B versus A).

Figure 9:
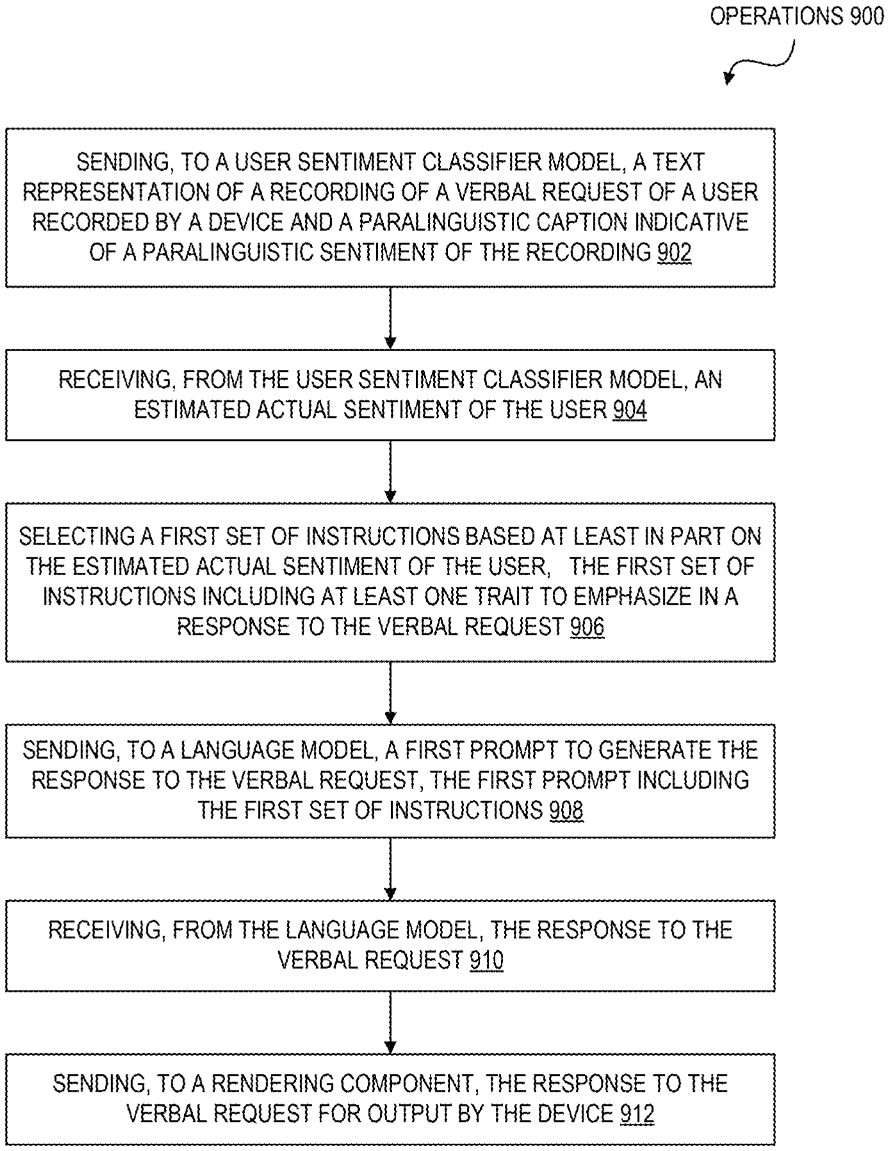
FIG. 9 is a flow diagram illustrating example operations of a method for situationally adaptive trait expression according to some examples.

FIG. 9 is a flow diagram illustrating operations of a method 900 for situationally adaptive trait expression according to some examples. In some examples, the method 900 is performed by one or more system components 220. At operation 902, a text representation of a recording of a verbal request of a user recorded by a device and a paralinguistic caption indicative of a paralinguistic sentiment of the recording is sent to a user sentiment classifier model (e.g., by the personality service 106 as part of processing the request 241). At operation 904, an estimated actual sentiment of the user is received from the user sentiment classifier model. At operation 906, a first set of instructions are selected based at least in part on the estimated actual sentiment of the user, the first set of instructions including at least one trait to emphasize in a response to the verbal request. These can be the dynamic SATE instructions and can be based on the sentiment and/or characteristics associated with the initial verbal request. At operation 908, a first prompt to generate the response to the verbal request including the first set of instructions is sent to a language model (e.g., the language model 108). Here, the dynamic SATE instructions can be included to provide the language model with context regarding the tone or traits to adopt in synthesizing a response to a user's request. At operation 910, the response to the verbal request is received from the language model, and at operation 912, the response to the verbal request is sent to a rendering component for output by the device. In some examples, the language model can be instructed to include stage directions, with the response including annotations providing directives for how the response should be rendered by the rendering component.

Figure 10:
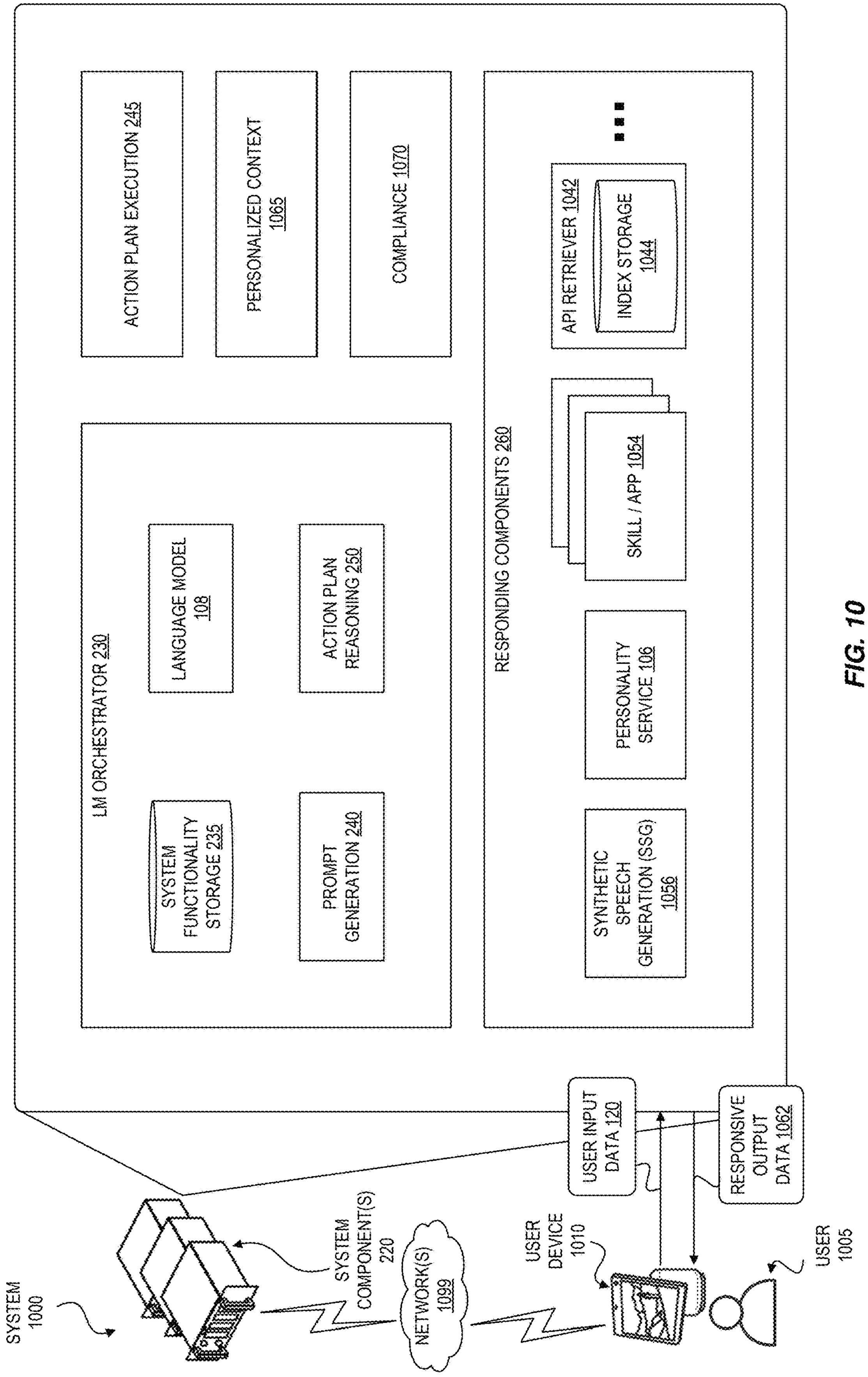
FIG. 10 is a diagram illustrating example components of a system configured to use a language model to determine a response to a user input, according to examples of the present disclosure.

FIG. 10 illustrates further example components included in a system of the present disclosure configured to use a language-model based approach to determine an action to be performed in response to a user input and determine a response to be presented to a user 1005. As shown in FIG. 10, the system 1000 may include a user device 1010 (e.g., the user device 101), local to the user 1005, in communication with a system component(s) 220 via a network(s) 1099. The network(s) 1099 may include the Internet and/or any other wide- or local-area network, and may include wired, wireless, and/or cellular network hardware.

Referring to FIG. 10, an action request may be sent to the API retriever component 1042. In such cases, the action request 236 may include a query to retrieve relevant APIs based on the action(s) data 251. In other words, the action request 236 may include a query to retrieve relevant APIs for performing a task represented in the action plan data 244. Thus, in at least some instances, the query received by the API retriever component 1042 may be task specific, rather than relate to the user input generally.

The API retriever component 1042 may be configured to receive a search query and output one or more APIs or API data corresponding to (e.g., satisfying, matching, etc.) the search query. API data may include an API call, an API description, and other information associated with the API. In some examples, the API retriever component 1042 may include or may be in communication with an index storage 1044. The index storage 1044 may store various information associated with multiple APIs. Examples of information stored in the index storage 1044 include: API/component descriptions (e.g., a description of one or more function that the API can be used to perform), API arguments (e.g., parameter inputs, input types, examples of input values, examples of output values, output type, etc.), identifiers for components corresponding to the API (e.g., alphanumerical component ID, component name, etc.), and other information. In some examples, the index storage 1044 may include other information associated with the API, such as historical accuracy/defect rate, historical latency value, feedback (e.g., user satisfaction/feedback, system-based feedback), etc. The index storage 1044 may also include sample user inputs corresponding to the API, where the sample user input may represent a user input for which the API can perform an action for.

The API retriever component 1042 may apply one or more retrieval techniques to determine API data corresponding to the search query. For example, the API retriever component 1042 may compare one or more APIs included/represented in the index storage 1044 to the user input data 120 represented in the search query to determine one or more APIs (top-k list). Such comparison may involve a semantic comparison between the user input data 120 and the API data. In some examples, the API retriever component 1042 may use a neural-based retrieval technique that may involve determining an encoded representation of the user input/search query and comparing (e.g., using cosine distance) the encoded representation(s) of the API data in the index storage 1044. The relevant APIs may be included in the action response 262.

In a non-limiting example, for a task of "book a flight," the API retriever component 1042 may determine one or more API calls corresponding to booking a flight (e.g., Bookflight.location ("departing airport code", "arrival airport code"), Bookflight.date ("departing date"), bookflight.rountrip ("departing location", "arrival location", "departure date", "return date"), AirlineBookFlight ("departing airport code", "arrival airport code"), etc.).

Some examples may include an exemplar provider component that may operate in a similar manner as the API retriever component 1042 in terms of implementing one or more retrieval techniques to determine exemplars corresponding to (e.g., satisfying, matching, etc.) a search query based on the action(s) data 251. The exemplar provider component may search an index storage including various information related to multiple different exemplars. In some examples, the index storage may include sample user inputs associated with an exemplar, and the relevant exemplars may be retrieved based on a comparison of the sample user inputs and a task represented in the action plan data 244. The retrieved exemplars may be included in the action response 262.

Referring still to FIG. 10, the system component(s) 220 may include a compliance component 1070. In some examples, the compliance component 1070 may be included in the language model orchestrator component 230. In other examples, the compliance component 1070 may be one of the responding components 260 and the action plan reasoning component 250 may cause the action plan execution component 225 to send an API request to the compliance component 1070 when processing by the compliance component 1070 is to be performed.

The compliance component 1070 may be configured to determine whether an output of the language model 108 is appropriate for output to the user 1005. In some examples, the compliance component 1070 may be configured to process language model output (e.g., the LM response 246) representing outputs/tokens generated by the language model 108 during processing of the user input data 120. The model output may include tokens generated during the task generation phase, the action generation phase or the response generation phase. The compliance component 1070 may also or instead determine whether an input to the language model 108 (e.g., a user request, an output of another system component of the system) is appropriate and/or that the input will result in the language model 108 generating an output that is appropriate to present to the user 1005. For this determination, the compliance component 1070 may process the user input data 120 or a portion or representation thereof. In some examples, the compliance component 1070 may process other data (e.g., context data, user profile data, system configuration/policy data, etc.) to determine whether the generated response and/or the input is appropriate.

In some examples, the compliance component 1070 may determine whether the model output/LM response 246 and/or the user input data 120 corresponds to training data used to configure the language model 108 (e.g., the model output or user input is semantically or lexically similar to the training data, the model output or user input corresponds to functionality (e.g., topics, categories, actions, etc.) that the model is trained for, etc.). Additionally or alternatively, the compliance component 1070 may determine whether the model output/LM response 246 and/or the user input data 120 corresponds to one or more words or phrases determined to be confidential, sensitive, or offensive. Additionally or alternatively, the compliance component 1070 may determine whether the user input or the model output corresponds to an inappropriate content category, which may include biased content (e.g., biased toward protected classes including gender, race, age, etc.), harmful content (e.g., violent content, self-harm, etc.), profanity, etc.

In some examples, the compliance component 1070 may use one or more techniques to determine whether the model output or the user input is appropriate; such techniques may include a rules-engine, a word-based similarity determination, a machine learning model based determination (e.g., using a classifier to classify model output or user input to appropriate category or inappropriate category), etc.

In some examples, the compliance component 1070 may process the user input data 120 when it is received by the language model orchestrator component 230 and in some cases may process in parallel to the language model orchestrator component 230. In some examples, the compliance component 1070 may process the model output as the language model 108 generates the output tokens. In other examples, the compliance component 1070 may process the model output after the language model 108 has generated tokens for a particular processing phase (e.g., after the task generation phase is completed, after the action generation phase is completed, after the response generation phase is completed, etc.).

If the compliance component 1070 determines that the model output or the user input data 120 is appropriate, then the language model orchestrator component 230 may continue processing with respect to the user input data 120. If the compliance component 1070 determines that the model output is not appropriate, then one or more remedial actions may be performed. One example remedial action may involve prompting the language model 108 to generate a new/modified model output. In such examples, additional prompt data may be determined, which may include the original prompt data, the initial model output, and an indication that the initial model output is not appropriate for output to the user 1005. The additional prompt data may include a request or directive to the language model 108 to generate model output that is appropriate for output to the user 1005. Another example remedial action may involve the system outputting a generic/template response (e.g., "Sorry, I can't help you with that" or "I cannot answer questions for [inappropriate category])") or a request for a rephrased input (e.g., "can you rephrase that").

In some examples, the compliance component 1070 may cause the system to output a response indicating where (e.g., a source external to the system components 220) the included/outputted information may be found. For example, the response may include an indication of a source of the training data or the data (e.g., action response 262) that the response is based on (e.g., the indication may include a description of an owner of the intellectual property rights corresponding to the training data/the response information, a hyperlink to the source, etc.). In some examples, the compliance component 1070 may determine that the model generated response is based on (e.g., summarizing, using, similar to, etc.) data that protected by intellectual property rights (or other laws), and instead of outputting the language model generated response (e.g., LM response 246), the responsive output data 1062 may include an indication of the intellectual property rights owner, may include access to a source of the data (e.g., website link), or may include a template response (e.g., "I cannot process this request" or "The requested data is protected by intellectual property rights", etc.). In some examples, the compliance component 1070 may determine that the user input data 120 involves processing data or outputting data that is protected by certain intellectual property rights (or other laws). An example of such a user input may be "write a story about [character]" or "draw an image of [character] doing [some action]", where the owner of intellectual property rights in the [character] may not allow use, copying, or other operations. In response, the system may cease or prevent processing by the language model orchestrator component 230 of the user input data 120, and the system may output a template response (e.g., "I cannot process this request" or "The requested data is protected by intellectual property rights", etc.).

As shown in FIG. 10, the system component(s) 220 may include a personalized context component 1065. In some examples, the personalized context component 1065 may be included in the language model orchestrator component 230. In other examples, the personalized context component 1065 may be one of the responding components 260 and the action plan reasoning component 250 may cause the action plan execution component 225 to send an API request to the personalized context component 1065.

The personalized context component 1065 may be configured to determine personalized context data including context data corresponding to the user input data 120 and/or the user 1005. In some examples, the initial plan generation component 1035 may request personalized context data to include in the prompt data 242. In other examples, other system component(s) 220, such as the language model 108, may request personalized context data (e.g., to determine a personalized response to a user input). The personalized context data may include user preferences, past user inputs, past system outputs for past user inputs from the user 1005, past skill/app usage, user-defined items, etc. The personalized context component 1065 may infer user preferences from user-provided preferences, past user interactions by the user 1005, information related to users similar to the user 1005, etc. In some examples, the personalized context component 1065 may employ one or more techniques to determine the personalized context data; such techniques may include using a rules-engine, using one or more machine learning models (including a generative model), topic determination techniques, neural retrieval search techniques, etc.

In examples, the personalized context component 1065 may receive the user input data 120, task data representing a current task being performed/processed, and/or model output indicating that an ambiguity exists or additional information is needed to generate a response to the user input. The personalized context component 1065 may receive a query in some examples, which may include an identifier for the user 1005. In a non-limiting example, the personalized context component 1065 may receive the following example requests: "Does the user prefer to use [Music Service 1] or [Music Service 2] for playing music," or "What kind of music does the user like?" The personalized context component 1065 determine example personalized context data including "The user prefers [Music Service 1]" or "The user likes [music genre]").

Further information related to the SSG component 1056 (e.g., a TTS component) and the skill/app component 1054 is described herein in relation to FIG. 11.

In some examples, the language model 108 may be fine-tuned to perform a particular task(s). Fine-tuning of the language model(s) may be performed using one or more techniques. One example fine-tuning technique is transfer learning that involves reusing a pre-trained model's weights and architecture for a new task. The pre-trained model may be trained on a large, general dataset, and the transfer learning approach allows for efficient and effective adaptation to specific tasks. Another example fine-tuning technique is sequential fine-tuning where a pre-trained model is fine-tuned on multiple related tasks sequentially. This allows the model to learn more nuanced and complex language patterns across different tasks, leading to better generalization and performance. Yet another fine-tuning technique is task-specific fine-tuning where the pre-trained model is fine-tuned on a specific task using a task-specific dataset. Yet another fine-tuning technique is multi-task learning where the pre-trained model is fine-tuned on multiple tasks simultaneously. This approach enables the model to learn and leverage the shared representations across different tasks, leading to better generalization and performance. Yet another fine-tuning technique is adapter training that involves training lightweight modules that are plugged into the pre-trained model, allowing for fine-tuning on a specific task without affecting the original model's performance on other tasks. Some techniques may involve supervised fine-tuning (SFT), unsupervised fine-tuning, semi-supervised fine-tuning, or other types of learning.

In some examples, one or more of the system components 220 described herein may be configured to begin processing with respect to data as soon as the data or a portion of the data is available to the components (e.g., processing in a streaming fashion). Some system components may be generative components/models that can begin processing with respect to portions of data as they are available, instead of waiting to initiate processing after the entirety of data is available. For example, the language model 108 may start processing a first portion of the prompt data 242 while the prompt generation component 1035 determines a second/subsequent portion of the prompt data 242. As another example, the action plan reasoning component 250 may start processing a first portion of the LM response 246 while the language model 108 is generating a second/subsequent portion of the LM response 246.

In some examples, the language model orchestrator component 230 may be configured to orchestrate processing by multiple different language models, where an individual language model may perform one (or more) processing phases. For example, a first language model may perform task generation, a second language model may perform action generation, and a third language model may perform response generation. In some examples, the language models may be different types of models, for example, a first language model may be a text-to-text generative model, a second language model may be a multi-modal generative model, a third language model may be a text-to-speech generative model, etc. In some examples, the language models may be different sizes (e.g., number of parameters), may have different processing capabilities, etc.

Some examples may enable use of other components, such as plugins, with the language model 108, where the plugins may add functionality and features to the language model's capabilities. For example, the plugins may be used to perform mathematical calculations (e.g., a calculator plugin), statistical analysis (e.g., a statistics plugin), natural language translation, speech generation, etc. For further example, the plugins may additionally, or alternatively, be used to perform an action responsive to a user input based on the response generated by the language model 108.

The system component(s) 220 may include other processing components configured to process user inputs and other type of inputs (e.g., sensor data, audio data, data indicative of an event occurring, etc.) received via the user device 1010. In example examples, the system component(s) 220 may process spoken inputs using ASR processing. The system component(s) 220 may also be configured to process non-spoken inputs, such as gestures, textual inputs, selection of GUI elements, selection of device buttons, etc. The system component(s) 220 may also include other components to understand an input, determine an action to be performed in response to receiving the input, generate an output responsive to the input, and the like. Such other components may perform natural language processing, SSG processing, etc., some of which are described herein in relation to FIG. 11.

The system may operate using various components as described in FIG. 11. The various components may be located on same or different physical devices. Communication between various components may occur directly or across a network(s) 1099. The user device 1010 may include audio capture component(s), such as a microphone or array of microphones of a user device 1010, captures audio 1110 and creates corresponding audio data. Once speech is detected in audio data representing the audio 1110, the user device 1010 may determine if the speech is directed at the user device 1010/system component(s). In at least some examples, such determination may be made using a wakeword detection component 1120. The wakeword detection component 1120 may be configured to detect various wakewords. In at least some examples, each wakeword may correspond to a name of a different digital assistant. An example wakeword/digital assistant name is "Alexa." In another example, input to the system may be in form of text data 1113, for example as a result of a user typing an input into a user interface of user device 1010. Other input forms may include indication that the user has pressed a physical or virtual button on user device 1010, the user has made a gesture, etc. The user device 1010 may also capture images using camera(s) of the user device 1010 and may send image data 1121 representing those image(s) to the system component(s). The image data 1121 may include raw image data or image data processed by the user device 1010 before sending to the system component(s). The image data 1121 may be used in various manners by different components of the system to perform operations such as determining whether a user is directing an utterance to the system, interpreting a user command, responding to a user command, etc.

The wakeword detection component 1120 of the user device 1010 may process the audio data, representing the audio 1110, to determine whether speech is represented therein. The user device 1010 may use various techniques to determine whether the audio data includes speech. In some examples, the user device 1010 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 1010 may implement a classifier configured to distinguish speech from background noise. The classifier may be implemented by techniques such as linear classifiers, support vector machines, and decision trees. In still other examples, the user device 1010 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 1110, is analyzed to determine if specific characteristics of the audio data match preconfigured acoustic waveforms, audio signatures, or other data corresponding to a wakeword.

Thus, the wakeword detection component 1120 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 1120 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 1120 and/or input is detected by an input detector, the user device 1010 may "wake" and begin transmitting audio data 1111, representing the audio 1110, to the system component(s) 220. The audio data 1111 may include data corresponding to the wakeword; in other examples, the portion of the audio corresponding to the wakeword is removed by the user device 1010 prior to sending the audio data 1111 to the system component(s) 220. In the case of touch input detection or gesture based input detection, the audio data may not include a wakeword.

In some implementations, the system may include more than one system component(s). The system component(s) 220 may respond to different wakewords and/or perform different categories of tasks. Each system component(s) may be associated with its own wakeword such that speaking a certain wakeword results in audio data being sent to and processed by a particular system. For example, detection of the wakeword "Alexa" by the wakeword detection component 1120 may result in sending audio data to system component(s) a for processing while detection of the wakeword "Computer" by the wakeword detector may result in sending audio data to system component(s) b for processing. The system may have a separate wakeword and system for different skills/systems (e.g., "Dungeon Master" for a game play skill/system component(s) c) and/or such skills/systems may be coordinated by one or more skill component(s) 1154 of one or more system component(s) 220.

The user device 1010/system component(s) may also include a system directed input detector 1185. The system directed input detector 1185 may be configured to determine whether an input to the system (for example speech, a gesture, etc.) is directed to the system or not directed to the system (for example directed to another user, etc.). The system directed input detector 1185 may work in conjunction with the wakeword detection component 1120. If the system directed input detector 1185 determines an input is directed to the system, the user device 1010 may "wake" and begin sending captured data for further processing. If data is being processed the user device 1010 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 1185 determines an input is not directed to the system (such as a speech or gesture directed to another user) the user device 1010 may discard the data and take no further action for processing purposes. In this way the system may prevent processing of data not directed to the system, thus protecting user privacy. As an indicator to the user, however, the system may output an audio, visual, or other indicator when the system directed input detector 1185 is determining whether an input is potentially device directed. For example, the system may output an orange indicator while considering an input and may output a green indicator if a system directed input is detected. Other such configurations are possible.

Upon receipt by the system component(s) 220, the audio data 1111 may be sent to an orchestrator component 1130 and/or the language model orchestrator component 230. The orchestrator component 1130 may include memory and logic that enables the orchestrator component 1130 to transmit various pieces and forms of data to various components of the system, as well as perform other operations as described herein. In some examples, the orchestrator component 1130 may optionally be included in the system component(s) 220. In examples where the orchestrator component 1130 is not included in the system component(s) 220, the audio data 1111 may be sent directly to the language model orchestrator component 230. Further, in such examples, each of the components of the system component(s) 220 may be configured to interact with the language model orchestrator component 230, the action plan execution component 225, and/or the API provider component.

In some examples, the system component(s) 220 may include an arbitrator component 1182, which may be configured to determine whether the orchestrator component 1130 and/or the language model orchestrator component 230 are to process with respect to the audio data 1111. In some examples, the language model orchestrator component 230 may be selected to process with respect to the audio data 1111 only if the user 1005 associated with the audio data 1111 (or the user device 1010 that captured the audio 1110) has previously indicated that the language model orchestrator component 230 may be selected to process with respect to user inputs received from the user 1005.

In some examples, the arbitrator component 1182 may determine the orchestrator component 1130 and/or the language model orchestrator component 230 are to process with respect to the audio data 1111 based on metadata associated with the audio data 1111. For example, the arbitrator component 1182 may be a classifier configured to process a natural language representation of the audio data 1111 (e.g., output by the ASR component 102) and classify the corresponding user input as to be processed by the orchestrator component 1130 and/or the language model orchestrator component 230. For further example, the arbitrator component 1182 may determine whether the device from which the audio data 1111 is received is associated with an indicator representing the audio data 1111 is to be processed by the orchestrator component 1130 and/or the language model orchestrator component 230. As an even further example, the arbitrator component 1182 may determine whether the user (e.g., determined using data output from the user recognition component 1195) from which the audio data 1111 is received is associated with a user profile including an indicator representing the audio data 1111 is to be processed by the orchestrator component 1130 and/or the language model orchestrator component 230. As another example, the arbitrator component 1182 may determine whether the audio data 1111 (or the output of the ASR component 102) corresponds to a request representing that the audio data 1111 is to be processed by the orchestrator component 1130 and/or the language model orchestrator component 230 (e.g., a request including "let's chat" may represent that the audio data 1111 is to be processed by the language model orchestrator component 230).

In some examples, if the arbitrator component 1182 is unsure (e.g., a confidence score corresponding to whether the orchestrator component 1130 and/or the language model orchestrator component 230 is to process is below a threshold), then the arbitrator component 1182 may send the audio data 1111 to both of the orchestrator component 1130 and the language model orchestrator component 230. In such examples, the orchestrator component 1130 and/or the language model orchestrator component 230 may include further logic for determining further confidence scores during processing representing whether the orchestrator component 1130 and/or the language model orchestrator component 230 should continue processing, as is discussed further herein below.

The arbitrator component 1182 may send the audio data 1111 to an ASR component 102. In some examples, the component selected to process the audio data 1111 (e.g., the orchestrator component 1130 and/or the language model orchestrator component 230) may send the audio data 1111 to the ASR component 102. The ASR component 102 may transcribe the audio data 1111 into text data. The text data output by the ASR component 102 represents one or more than one (e.g., in the form of an N-best list) ASR hypotheses representing speech represented in the audio data 1111. The ASR component 102 interprets the speech in the audio data 1111 based on a similarity between the audio data 1111 and pre-established language models. For example, the ASR component 102 may compare the audio data 1111 with models for sounds (e.g., acoustic units such as phonemes, senons, phones, etc.) and sequences of sounds to identify words that match the sequence of sounds of the speech represented in the audio data 1111. The ASR component 102 can also include the paralinguistic classifier model 104 as described above to generate the paralinguistic classification.

The ASR component 102 sends the text data and paralinguistic caption generated thereby to the arbitrator component 1182, the orchestrator component 1130, and/or the language model orchestrator component 230. In instances where the text data and paralinguistic caption is sent to the arbitrator component 1182, the arbitrator component 1182 may send the text data to the component selected to process the audio data 1111 (e.g., the orchestrator component 1130 and/or the language model orchestrator component 230). The text data sent from the ASR component 102 to the arbitrator component 1182, the orchestrator component 1130, and/or the language model orchestrator component 230 may include a single top-scoring ASR hypothesis or may include an N-best list including multiple top-scoring ASR hypotheses. An N-best list may additionally include a respective score associated with each ASR hypothesis represented therein. In some examples, the orchestrator component 1130 may cause a NLU component (not shown) to perform processing with respect to the ASR data generated by the ASR component 102. The NLU component may attempt to make a semantic interpretation of the phrase(s) or statement(s) represented in the ASR data input therein by determining one or more meanings associated with the phrase(s) or statement(s) represented in the text data. The NLU component may determine an intent representing an action that a user desires be performed and may determine information that allows a device (e.g., the device 1010, the system component(s) 220, a skill component 1154, a skill system component(s) 1125, etc.) to execute the intent. For example, if the ASR data corresponds to "play the 5th Symphony by Beethoven," the NLU component may determine an intent that the system output music and may identify "Beethoven" as an artist/composer and "5th Symphony" as the piece of music to be played. For further example, if the ASR data corresponds to "what is the weather," the NLU component may determine an intent that the system output weather information associated with a geographic location of the device 1010. In another example, if the ASR data corresponds to "turn off the lights," the NLU component may determine an intent that the system turn off lights associated with the device 1010 or the user 1005. However, if the NLU component is unable to resolve the entity—for example, because the entity is referred to by anaphora such as "this song" or "my next appointment"—the system can send a decode request to another speech processing system for information regarding the entity mention and/or other context related to the utterance. The natural language processing system may augment, correct, or base results data upon the ASR data as well as any data received from the system.

The NLU component may return NLU results data (which may include tagged text data, indicators of intent, etc.) back to the orchestrator component 1130. The orchestrator component 1130 may forward the NLU results data to a skill component(s) 1154. If the NLU results data includes a single NLU hypothesis, the NLU component and the orchestrator component 1130 may direct the NLU results data to the skill component(s) 1154 associated with the NLU hypothesis. If the NLU results data includes an N-best list of NLU hypotheses, the NLU component and the orchestrator component 1130 may direct the top scoring NLU hypothesis to a skill component(s) 1154 associated with the top scoring NLU hypothesis. The system may also include a post-NLU ranker which may incorporate other information to rank potential interpretations determined by the NLU component.

In some examples, after determining that the orchestrator component 1130 and/or the language model orchestrator component 230 should process with respect to the user input data 120, the arbitrator 1182 may be configured to periodically determine whether the orchestrator component 1130 and/or the language model orchestrator component 230 should continue processing with respect to the user input data 120. For example, after a particular point in the processing of the orchestrator component 1130 (e.g., after performing NLU, prior to determining a skill component 1154 to process with respect to the user input data 120, prior to performing an action responsive to the user input, etc.) and/or the language model orchestrator component 230 (e.g., after selecting a task to be completed, after receiving the action response data from the one or more components, after completing a task, prior to performing an action responsive to the user input, etc.) the orchestrator component 1130 and/or the language model orchestrator component 230 may query the arbitrator component 1182 has determined that the orchestrator component 1130 and/or the language model orchestrator component 230 should halt processing with respect to the user input data 120. As discussed above, the system may be configured to stream portions of data associated with processing with respect to a user input to the one or more components such that the one or more components may begin performing their configured processing with respect to that data as soon as it is available to the one or more components. As such, the arbitrator component 1182 may cause the orchestrator component 1130 and/or the language model orchestrator component 230 to begin processing with respect to a user input as soon as a portion of data associated with the user input data 120 is available (e.g., the ASR data, context data, output of the user recognition component 1195. Thereafter, once the arbitrator component 1182 has enough data to perform the processing described herein above to determine whether the orchestrator component 1130 and/or the language model orchestrator component 230 is to process with respect to the user input, the arbitrator component 1182 may inform the corresponding component (e.g., the orchestrator component 1130 and/or the language model orchestrator component 230) to continue/halt processing with respect to the user input at one of the logical checkpoints in the processing of the orchestrator component 1130 and/or the language model orchestrator component 230.

In some examples with SATE, the system components 220 can include the personality service 104 described herein.

A skill system component(s) 1125 may communicate with a skill component(s) 1154 within the system component(s) 220 directly with the orchestrator component 1130 and/or the action plan execution component 225, or with other components. A skill system component(s) 1125 may be configured to perform one or more actions. An ability to perform such action(s) may sometimes be referred to as a "skill." That is, a skill may enable a skill system component(s) 1125 to execute specific functionality in order to provide data or perform some other action requested by a user. For example, a weather service skill may enable a skill system component(s) 1125 to provide weather information to the system component(s) 220, a car service skill may enable a skill system component(s) 1125 to book a trip with respect to a taxi or ride sharing service, an order pizza skill may enable a skill system component(s) 1125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 220 may be configured with a skill component 1154 dedicated to interacting with the skill system component(s) 1125. Unless expressly stated otherwise, reference to a skill, skill device, or skill component may include a skill component 1154 operated by the system component(s) 220 and/or skill operated by the skill system component(s) 1125. Moreover, the functionality described herein as a skill or skill may be referred to using many different terms, such as an action, bot, app, or the like. The skill component 1154 and or skill system component(s) 1125 may return output data to the orchestrator component 1130.

In at least some examples, a hybrid selector, of the user device 1010, may send the audio data 1111 to the wakeword detection component 1120. If the wakeword detection component 1120 detects a wakeword in the audio data 1111, the wakeword detection component 1120 may send an indication of such detection to the hybrid selector. In response to receiving the indication, the hybrid selector may send the audio data 1111 to the system component(s) and/or the ASR component of the user device 1010. The wakeword detection component 1120 may also send an indication to the hybrid selector representing a wakeword was not detected. In response to receiving such an indication, the hybrid selector may refrain from sending the audio data 1111 to the system component(s) and may prevent the ASR component of the user device 1010 from further processing the audio data 1111. In this situation, the audio data 1111 can be discarded.

The user device 1010 may conduct its own speech processing using on-device language processing components, such as an ASR component, similar to the manner discussed herein with respect to the ASR component 102 of the system component(s). The user device 1010 may also internally include, or otherwise have access to, other components such as one or more skill components capable of executing commands based on the output of an orchestrator component, a language model orchestrator component, or other results determined by the user device 1010/system component(s) (which may operate similarly to skill components 1154), an arbitrator component (configured to process in a similar manner to that discussed herein above with respect to the arbitrator component 1182), an action plan execution component (configured to process in a similar manner to that discussed herein with respect to the action plan execution component 225), a personalized context component (configured to process in a similar manner to that discussed herein with respect to the personalized context component 1065), a user recognition component (configured to process in a similar manner to that discussed herein with respect to the user recognition component 1195 of the system component(s)), profile storage (configured to store similar profile data to that discussed herein with respect to the profile storage 1170 of the system component(s)), or other components. In at least some examples, the profile storage may only store profile data for a user or group of users specifically associated with the user device 1010. Similar to as described above with respect to skill component 1154, a skill component of the user device 1010 may communicate with a skill system component(s) 1125. The user device 1010 may also have its own SSG component, which may operate similarly to SSG component 1056.

In at least some examples, the on-device language processing components may not have the same capabilities as the language processing components of the system component(s). For example, the on-device language processing components may be configured to handle only a subset of the natural language user inputs that may be handled by the system component(s). For example, such subset of natural language user inputs may correspond to local-type natural language user inputs, such as those controlling devices or components associated with a user's home. In such circumstances the on-device language processing components may be able to interpret and respond to a local-type natural language user input, for example, than processing that involves the system component(s) more quickly. If the user device 1010 attempts to process a natural language user input for which the on-device language processing components are not necessarily best suited, the language processing results determined by the user device 1010 may indicate a low confidence or other metric indicating that the processing by the user device 1010 may not be as accurate as the processing done by the system component(s).

The hybrid selector, of the user device 1010, may include a hybrid proxy (HP) configured to proxy traffic to/from the system component(s). For example, the HP may be configured to send messages to/from a hybrid execution controller (HEC) of the hybrid selector. For example, command/directive data received from the system component(s) can be sent to the HEC using the HP. The HP may also be configured to allow the audio data 1111 to pass to the system component(s) while also receiving (e.g., intercepting) this audio data 1111 and sending the audio data 1111 to the HEC.

In at least some examples, the hybrid selector may further include a local request orchestrator (LRO) configured to notify the ASR component of the user device 1010 about the availability of new audio data 1111 that represents user speech, and to otherwise initiate the operations of local language processing when new audio data 1111 becomes available. In general, the hybrid selector may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 1010 receives directive data from the system component(s) and chooses to use that remotely-determined directive data.

Thus, when the audio data 1111 is received, the HP may allow the audio data 1111 to pass through to the system component(s) and the HP may also input the audio data 1111 to the on-device ASR component by routing the audio data 1111 through the HEC of the hybrid selector, whereby the LRO notifies the on-device ASR component of the audio data 1111. At this point, the hybrid selector may wait for response data from either or both of the system component(s) or the local language processing components. However, the disclosure is not limited thereto, and in some examples the hybrid selector may send the audio data 1111 only to the local ASR component without departing from the disclosure. For example, the user device 1010 may process the audio data 1111 locally without sending the audio data 1111 to the system component(s).

The local ASR component is configured to receive the audio data 1111 from the hybrid selector, and to recognize speech in the audio data 1111. The user device 1010 and/or the system component(s) may associate a unique identifier with each natural language user input. The user device 1010 may include the unique identifier when sending the audio data 1111 to the system component(s), and the response data from the system component(s) may include the unique identifier to identify which natural language user input the response data corresponds.

In at least some examples, the user device 1010 may include, or be configured to use, one or more skill components that may work similarly to the skill component(s) 1154 implemented by the system component(s). The skill component(s) may correspond to one or more domains that are used in order to determine how to act on a spoken input in a particular way, such as by outputting a directive that corresponds to the determined intent, and which can be processed to implement the desired operation. The skill component(s) installed on the user device 1010 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally, or alternatively, the user device 1010 may be in communication with one or more skill system component(s) 1125. For example, a skill system component(s) 1125 may be located in a remote environment (e.g., separate location) such that the user device 1010 may only communicate with the skill system component(s) 1125 via the network(s) 1099. However, the disclosure is not limited thereto. For example, in at least some examples, a skill system component(s) 1125 may be configured in a local environment (e.g., home server and/or the like) such that the user device 1010 may communicate with the skill system component(s) 1125 via a private network, such as a local area network (LAN).

A skill system component(s) 1125 may communicate with a skill component(s) 1154 within the system component(s) 220 directly with the orchestrator component 1130 and/or the action plan execution component 225, or with other components. A skill system component(s) 1125 may be configured to perform one or more actions. An ability to perform such action(s) may sometimes be referred to as a "skill." That is, a skill may enable a skill system component(s) 1125 to execute specific functionality in order to provide data or perform some other action requested by a user. For example, a weather service skill may enable a skill system component(s) 1125 to provide weather information to the system component(s) 220, a car service skill may enable a skill system component(s) 1125 to book a trip with respect to a taxi or ride sharing service, an order pizza skill may enable a skill system component(s) 1125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 220 may be configured with a skill component 1154 dedicated to interacting with the skill system component(s) 1125. Unless expressly stated otherwise, reference to a skill, skill device, or skill component may include a skill component 1154 operated by the system component(s) 220 and/or skill operated by the skill system component(s) 1125. Moreover, the functionality described herein as a skill or skill may be referred to using many different terms, such as an action, bot, app, or the like. The skill component 1154 and/or skill system component(s) 1125 may return output data to the orchestrator component 1130.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a SSG component 1056. The SSG component 1056 may generate audio data (e.g., synthesized speech) from text data using one or more different methods. Text data input to the SSG component 1056 may come from a skill component 1154, the orchestrator component 1130, or another component of the system. In one method of synthesis called unit selection, the SSG component 1056 matches text data against a database of recorded speech. The SSG component 1056 selects matching units of recorded speech and concatenates the units together to form audio data. In another method of synthesis called parametric synthesis, the SSG component 1056 varies parameters such as frequency, volume, and noise to create audio data including an artificial speech waveform. Parametric synthesis uses a computerized voice generator, sometimes called a vocoder.

The user device 1010 may include still image and/or video capture components such as a camera or cameras to capture one or more images. The user device 1010 may include circuitry for digitizing the images and/or video for transmission to the system component(s) 220 as image data. The user device 1010 may further include circuitry for voice command-based control of the camera, allowing a user 1005 to request capture of image or video data. The user device 1010 may process the commands locally or send audio data 1111 representing the commands to the system component(s) 220 for processing, after which the system component(s) 220 may return output data that can cause the user device 1010 to engage its camera.

The system component(s) 220 may include a user recognition component 1195 that recognizes one or more users using a variety of data. The user recognition component 1195 may take as input the audio data 1111 and/or text data output by the ASR component 102. The user recognition component 1195 may perform user recognition by comparing audio characteristics in the audio data 1111 to stored audio characteristics of users. The user recognition component 1195 may also perform user recognition by comparing biometric data (e.g., fingerprint data, iris data, etc.), received by the system in correlation with the present user input, to stored biometric data of users assuming user permission and previous authorization. The user recognition component 1195 may further perform user recognition by comparing image data (e.g., including a representation of at least a feature of a user), received by the system in correlation with the present user input, with stored image data including representations of features of different users. The user recognition component 1195 may perform additional user recognition processes, including those known in the art.

The user recognition component 1195 determines scores indicating whether user input originated from a particular user. For example, a first score may indicate a likelihood that the user input originated from a first user, a second score may indicate a likelihood that the user input originated from a second user, etc. The user recognition component 1195 also determines an overall confidence regarding the accuracy of user recognition operations.

Output of the user recognition component 1195 may include a single user identifier corresponding to the most likely user that originated the user input. Alternatively, output of the user recognition component 1195 may include an N-best list of user identifiers with respective scores indicating likelihoods of respective users originating the user input. The output of the user recognition component 1195 may be used to inform processing of the arbitrator component 1182, the orchestrator component 1130, and/or the language model orchestrator component 230 as well as processing performed by other components of the system.

The system component(s) 220/user device 1010 may include a presence detection component that determines the presence and/or location of one or more users using a variety of data.

The system (either on user device 1010, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 1170 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 1010, the user profile (associated with the presented login information) may be updated to include information about the user device 1010, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 1170 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 1170 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 11 may be illustrated as part of system component(s) 220, user device 1010, or otherwise, the components may be arranged in other device(s) (such as in user device 1010 if illustrated in system component(s) 220 or vice-versa, or in other device(s) altogether) without departing from the disclosure.

In at least some examples, the system component(s) may receive the audio data 1111 from the user device 1010, to recognize speech corresponding to a spoken input in the received audio data 1111, and to perform functions in response to the recognized speech. In at least some examples, these functions involve sending directives (e.g., commands), from the system component(s) to the user device 1010 (and/or other user devices 1010) to cause the user device 1010 to perform an action, such as output an audible response to the spoken input via a loudspeaker(s), and/or control secondary devices in the environment by sending a control command to the secondary devices.

Thus, when the user device 1010 is able to communicate with the system component(s) over the network(s) 1099, some or all of the functions capable of being performed by the system component(s) may be performed by sending one or more directives over the network(s) 1099 to the user device 1010, which, in turn, may process the directive(s) and perform one or more corresponding actions. For example, the system component(s), using a remote directive that is included in response data (e.g., a remote response), may instruct the user device 1010 to output an audible response (e.g., using SSG processing performed by an on-device SSG component) to a user's question via a loudspeaker(s) of (or otherwise associated with) the user device 1010, to output content (e.g., music) via the loudspeaker(s) of (or otherwise associated with) the user device 1010, to display content on a display of (or otherwise associated with) the user device 1010, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 1005 as part of a shopping function, establishing a communication session (e.g., a video call) between the user 1005 and another user, and so on.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 12:
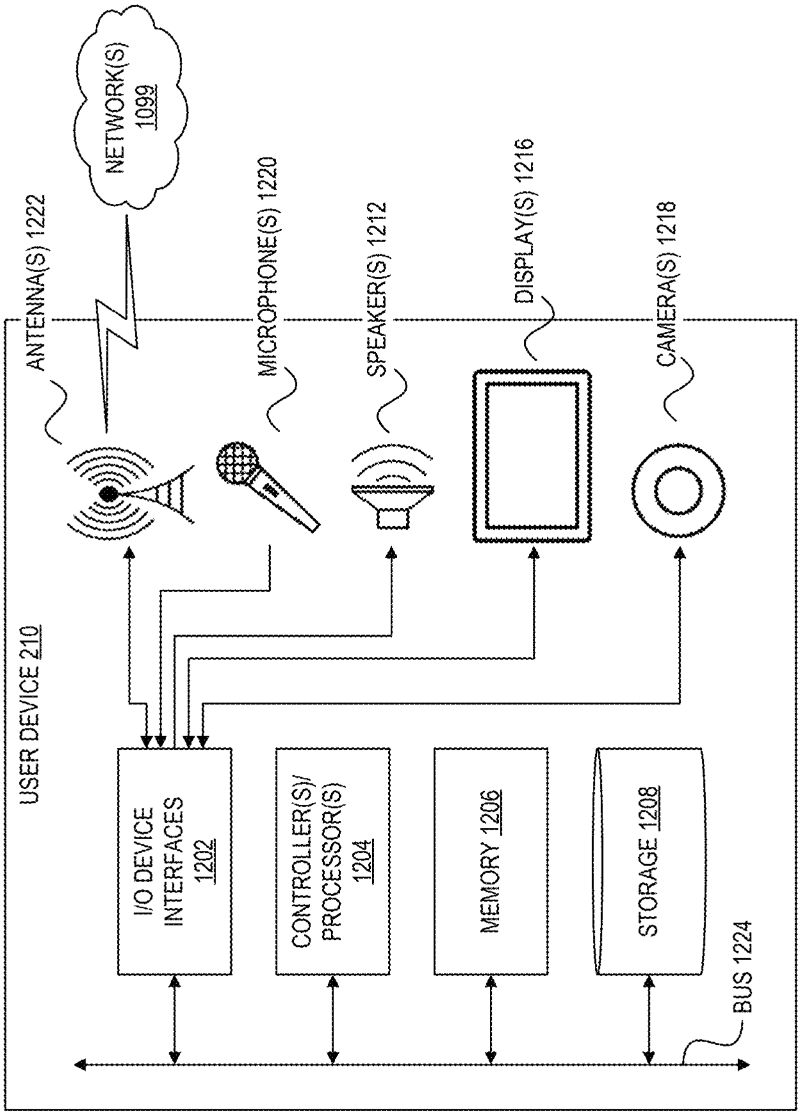
FIG. 12 is a block diagram conceptually illustrating example components of a device, according to examples of the present disclosure.
Figure 13:
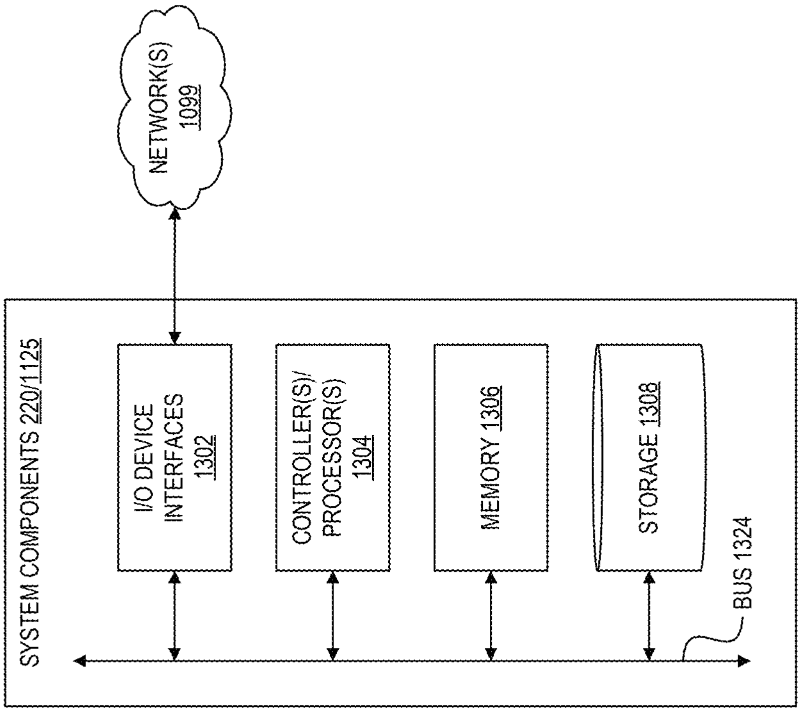
FIG. 13 is a block diagram conceptually illustrating example components of a system, according to examples of the present disclosure.

FIG. 12 is a block diagram conceptually illustrating a user device 1010 that may be used with the system. FIG. 13 is a block diagram conceptually illustrating example components of a remote device, such as the natural language command processing system component(s), which may assist with ASR processing, NLU processing, etc., and a skill system component(s) 1125. System component(s) (220/1125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 1010 may operate locally to a user (e.g., within a same environment so the device may receive inputs and playback outputs for the user) the server/system component(s) may be located remotely from the user device 1010 as its operations may not require proximity to the user. The server/system component(s) may be located in an entirely different location from the user device 1010 (for example, as part of a cloud computing system or the like) or may be located in a same environment as the user device 1010 but physically separated therefrom (for example a home server or similar device that resides in a user's home or business but perhaps in a closet, basement, attic, or the like). The system component(s) 220 may also be a version of a user device 1010 that includes different (e.g., more) processing capabilities than other user device(s) 1010 in a home/office. One benefit to the server/system component(s) being in a user's home/business is that data used to process a command/return a response may be kept within the user's home, thus reducing potential privacy concerns.

Multiple system components (220/1125) may be included in the overall system of the present disclosure, such as one or more natural language processing system component(s) 220 for performing ASR processing, one or more natural language processing system component(s) 220 for performing NLU processing, one or more skill system component(s) 1125, etc. In operation, each of these systems may include computer-readable and computer-executable instructions that reside on the respective device (220/1125), as will be discussed further below.

Each of these devices (1010/220/1125) may include one or more controllers/processors (1204/1304), which may each include a central processing unit (CPU) for processing data and computer-readable instructions, and a memory (1206/1306) for storing data and instructions of the respective device. The memories (1206/1306) may individually include volatile random-access memory (RAM), non-volatile read only memory (ROM), non-volatile magneto-resistive memory (MRAM), and/or other types of memory. Each device (1010/220/725) may also include a data storage component (1208/1308) for storing data and controller/processor-executable instructions. Each data storage component (1208/1308) may individually include one or more non-volatile storage types such as magnetic storage, optical storage, solid-state storage, etc. Each device (1010/220/725) may also be connected to removable or external non-volatile memory and/or storage (such as a removable memory card, memory key drive, networked storage, etc.) through respective input/output device interfaces (1202/1302).

Computer instructions for operating each device (1010/220/725) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (1010/220/725) includes input/output device interfaces (1202/1302). A variety of components may be connected through the input/output device interfaces (1202/1302), as will be discussed further below. Additionally, each device (1010/220/725) may include an address/data bus (1224/1324) for conveying data among components of the respective device. Each component within a device (1010/220/725) may also be directly connected to other components in addition to (or instead of) being connected to other components across the bus (1224/1324).

Referring to FIG. 12, the user device 1010 may include input/output device interfaces 1202 that connect to a variety of components such as an audio output component such as a speaker 1212, a wired headset or a wireless headset (not illustrated), or other component capable of outputting audio. The user device 1010 may also include an audio capture component. The audio capture component may be, for example, a microphone 1220 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 1010 may additionally include a display 1216 for displaying content. The user device 1010 may further include a camera 1218.

Via antenna(s) 1222, the input/output device interfaces 1202 may connect to one or more networks 1099 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 1099, the system may be distributed across a networked environment. The I/O device interface (1202/1302) may also include communication components that allow data to be exchanged between devices such as different physical servers in a collection of servers or other components.

The components of the user device(s) 1010, the natural language command processing system component(s), or a skill system component(s) 1125 may include their own dedicated processors, memory, and/or storage. Alternatively, one or more of the components of the user device(s) 1010, the natural language command processing system component(s), or a skill system component(s) 1125 may utilize the I/O interfaces (1202/1302), processor(s) (1204/1304), memory (1206/1306), and/or storage (1208/1308) of the user device(s) 1010, natural language command processing system component(s), or the skill system component(s) 1125, respectively. Thus, the ASR component 102 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 1010, the natural language command processing system component(s), and a skill system component(s) 1125, as described herein, are illustrative, and may be located as a stand-alone device or may be included, in whole or in part, as a component of a larger device or system. As can be appreciated, a number of components may exist either on a system component(s) and/or on user device 1010. Unless expressly noted otherwise, the system version of such components may operate similarly to the device version of such components and thus the description of one version (e.g., the system version or the local version) applies to the description of the other version (e.g., the local version or system version) and vice-versa.

Figure 14:
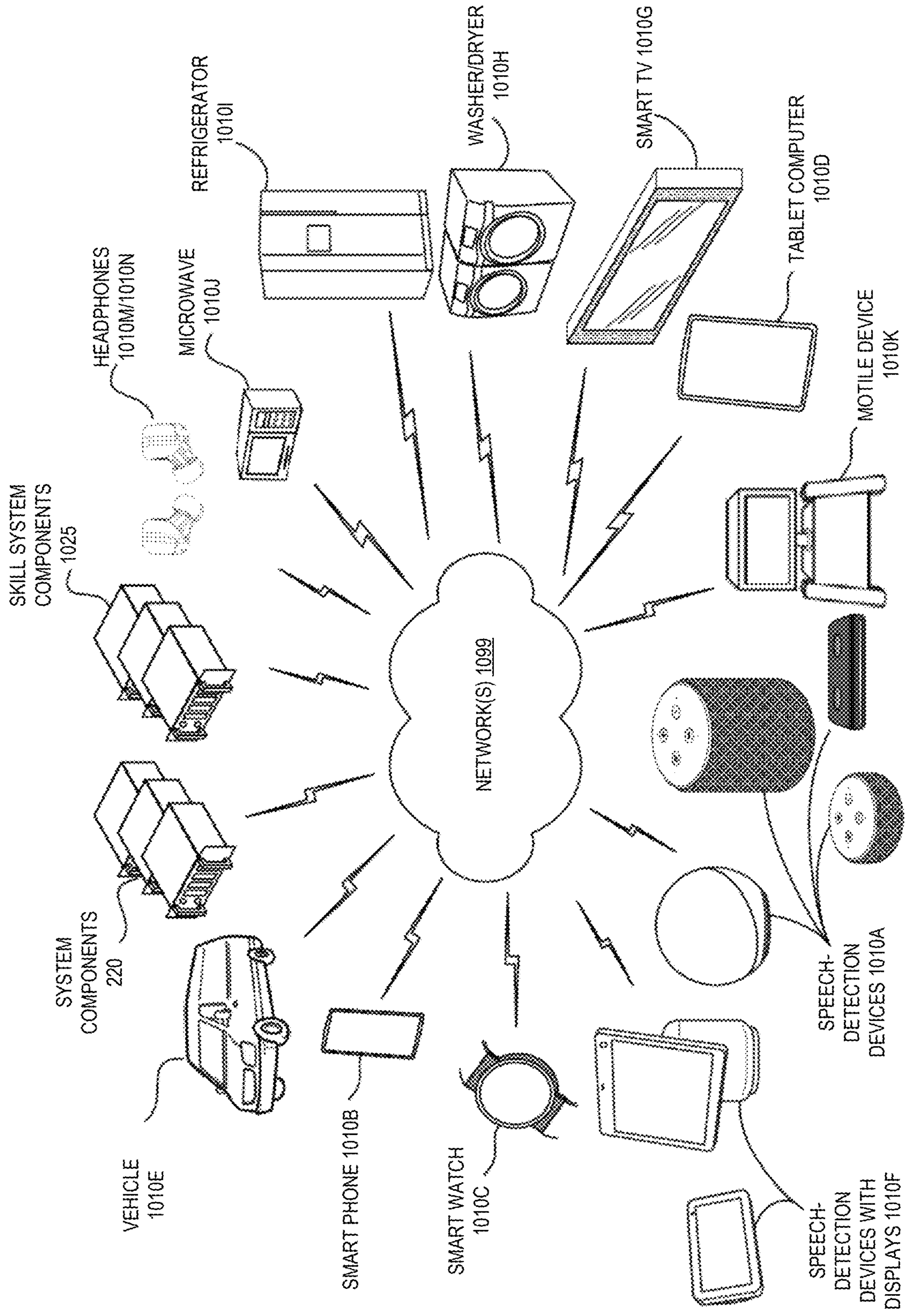
FIG. 14 illustrates an example of a network for use with the overall system, according to examples of the present disclosure.

As illustrated in FIG. 14, multiple devices (1010*a*-1010*n*, 220, 1125) may contain components of the system and the devices may be connected over a network(s) 1099. The network(s) 1099 may include a local or private network or may include a wide network such as the Internet. Devices may be connected to the network(s) 1099 through either wired or wireless connections. For example, a speech-detection user device 1010*a*, a smart phone 1010*b*, a smart watch 1010*c*, a tablet computer 1010*d*, a vehicle 1010*e*, a speech-detection device with display 1010*f*, a display/smart television 1010*g*, a washer/dryer 1010*h*, a refrigerator 1010*i*, a microwave 1010*j*, autonomously motile user device 1010*k* (e.g., a robot), etc., may be connected to the network(s) 1099 through a wireless service provider, over a Wi-Fi or cellular network connection, or the like. Other devices are included as network-connected support devices, such as the natural language command processing system component(s) 220, the skill system component(s) 1125, and/or others. The support devices may connect to the network(s) 1099 through a wired connection or wireless connection. Networked devices may capture audio using one-or-more built-in or connected microphones or other audio capture devices, with processing performed by ASR components, NLU components, or other components of the same device or another device connected via the network(s) 1099, such as the ASR component 102, etc. of the natural language command processing system component(s) 220.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one example discussed herein may be combined with features/operations/components, etc. from another example discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements and/or steps. Thus, such conditional language is not generally intended to imply that features, elements, and/or steps are in any way required for one or more examples or that one or more examples necessarily include logic for deciding, with or without other input or prompting, whether these features, elements, and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
- receiving a text representation and a paralinguistic caption of a verbal request of a user recorded by a remote device, wherein the text representation is a speech-to-text translation of the verbal request and the paralinguistic caption is indicative of a paralinguistic sentiment of the user;
- selecting a set of static instructions for a language model, the set of static instructions including a set of traits that can be assumed in generating a response to the verbal request, wherein the set of traits are selected based on a characteristic associated with the verbal request;
- sending, to the language model, a first prompt including the set of static instructions, wherein the language model processes the first prompt for a first period of time;
- sending, to a user sentiment classifier model, the text representation and the paralinguistic caption;
- receiving, from the user sentiment classifier model, an indication of an estimated actual sentiment of the user;
- selecting, during at least a portion of the first period of time, a set of dynamic instructions based on an indication of an estimated actual sentiment of the user, wherein the set of dynamic instructions includes a trait in the set of traits to emphasize in generating the response to the verbal request;
- sending, to the language model, a second prompt to generate a response to the verbal request, the second prompt including the set of dynamic instructions;
- receiving, from the language model, the response to the verbal request, the response including one or more tags indicative of directives for rendering the response; and
- sending, to a text-to-speech component, the response to the verbal request and the one or more tags to be rendered as audio playback by the remote device.

2. The computer-implemented method of claim 1, wherein the language model processes the first prompt or another prompt for a first period of time, and wherein the user sentiment classifier model processes the text representation the paralinguistic caption to generate the estimated actual sentiment of the user during at least a portion of the first period of time.

3. The computer-implemented method of claim 1, further comprising:
- sending, to a paralinguistic classifier model, a recording of the verbal request; and
- receiving, from the paralinguistic classifier model, the paralinguistic caption.

4. A computer-implemented method comprising:
- sending, to a user sentiment classifier model, a text representation of a recording of a verbal request of a user recorded by a device and a paralinguistic caption indicative of a paralinguistic sentiment of the recording;
- receiving, from the user sentiment classifier model, an estimated actual sentiment of the user;
- selecting a first set of instructions based at least in part on the estimated actual sentiment of the user, the first set of instructions including at least one trait to emphasize in a response to the verbal request;
- sending, to a language model, a first prompt to generate the response to the verbal request, the first prompt including the first set of instructions;
- receiving, from the language model, the response to the verbal request; and
- sending, to a rendering component, the response to the verbal request for output by the device.

5. The computer-implemented method of claim 4, further comprising:
- selecting a second set of instructions for the language model, the second set of instructions including a set of traits that can be assumed in a response to a verbal request from a user, wherein the set of traits are selected based on a characteristic associated with the verbal request, and wherein the at least one trait to emphasize is included in the set of traits; and
- sending, to the language model, a second prompt including the second set of instructions, wherein the second prompt is sent to the language model prior to the first prompt.

6. The computer-implemented method of claim 5, wherein the language model processes the second prompt or another prompt for a first period of time, and wherein the user sentiment classifier model processes the text representation the paralinguistic caption to generate the estimated actual sentiment of the user during at least a portion of the first period of time.

7. The computer-implemented method of claim 5, further comprising:
- obtaining a locale associated with the device,
- wherein the set of traits include:
  - at least a globally applicable trait or a location-specific trait applicable to the locale; and
  - at least a globally applicable behavioral rule or a location-specific behavioral rule applicable to the locale.

8. The computer-implemented method of claim 5, wherein the second set of instructions includes stage direction instructions, the stage direction instructions indicating how the language model should annotate the response to the verbal request with directives for response rendering;

wherein the response includes annotations indicative of directives for rendering the response to the verbal request; and sending the annotations to the rendering component.

9. The computer-implemented method of claim 5, wherein the set of traits is associated with a persona assumed by the device.

10. The computer-implemented method of claim 5, further comprising obtaining an indication of a set of traits associated with a user preference, wherein the at least one trait in the set of traits is based at least in part on the user preference.

11. The computer-implemented method of claim 4, further comprising:

sending, to a paralinguistic classifier model, the recording of the verbal request; and receiving, from the paralinguistic classifier model, the paralinguistic caption.

12. The computer-implemented method of claim 4, wherein the first set of instructions are generated during at least a first period of time, and wherein the language model performs at least one other task during at least a portion of the first period of time.

13. A computing system comprising:

at least one processor; and at least one memory comprising instructions that, when executed by the at least one processor, cause the computing system to:

send, to a user sentiment classifier model, a text representation of a recording of a verbal request of a user recorded by a device and a paralinguistic caption indicative of a paralinguistic sentiment of the recording;

receive, from the user sentiment classifier model, an estimated actual sentiment of the user;

select a first set of instructions based at least in part on the estimated actual sentiment of the user, the first set of instructions including at least one trait to emphasize in a response to the verbal request;

send, to a language model, a first prompt to generate the response to the verbal request, the first prompt including the first set of instructions;

receive, from the language model, the response to the verbal request; and send, to a rendering component, the response to the verbal request for output by the device.

14. The computing system of claim 13, wherein the at least one memory further comprises instructions that, when executed by the at least one processor, further cause the computing system to:

select a second set of instructions for the language model, the second set of instructions including a set of traits that can be assumed in a response to a verbal request from a user, wherein the set of traits are selected based on a characteristic associated with the verbal request, and wherein the at least one trait to emphasize is included in the set of traits; and send, to the language model, a second prompt including the second set of instructions, wherein the second prompt is sent to the language model prior to the first prompt.

15. The computing system of claim 14, wherein the language model processes the second prompt or another prompt for a first period of time, and wherein the user sentiment classifier model processes the text representation the paralinguistic caption to generate the estimated actual sentiment of the user during at least a portion of the first period of time.

16. The computing system of claim 14, wherein the at least one memory further comprises instructions that, when executed by the at least one processor, further cause the computing system to:

obtain a locale associated with the device, wherein the set of traits include:

at least a globally applicable trait or a location-specific trait applicable to the locale; and at least a globally applicable behavioral rule or a location-specific behavioral rule applicable to the locale.

17. The computing system of claim 14:

wherein the second set of instructions includes stage direction instructions, the stage direction instructions indicating how the language model should annotate the response to the verbal request with directives for response rendering;

wherein the response includes annotations indicative of directives for rendering the response to the verbal request; and wherein the at least one memory further comprises instructions that, when executed by the at least one processor, further cause the computing system to send the annotations to the rendering component.

18. The computing system of claim 14, wherein the set of traits is associated with a persona assumed by the device.

19. The computing system of claim 14, wherein the at least one memory further comprises instructions that, when executed by the at least one processor, further cause the computing system to obtain an indication of a set of traits associated with a user preference, wherein the at least one trait in the set of traits is based at least in part on the user preference.

20. The computing system of claim 13, wherein the at least one memory further comprises instructions that, when executed by the at least one processor, further cause the computing system to:

send, to a paralinguistic classifier model, the recording of the verbal request; and receive, from the paralinguistic classifier model, the paralinguistic caption.

* * * * *